(12) United States Patent
Weng

(10) Patent No.: US 6,472,008 B2
(45) Date of Patent: *Oct. 29, 2002

(54) METHOD FOR ADMINISTERING AND PROVIDING ON-LINE CORRECTION OF A BATCH STERILIZATION PROCESS

(75) Inventor: Zhijun Weng, Fresno, CA (US)

(73) Assignee: FMC Technologies, Inc., Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,333

(22) Filed: Nov. 6, 1998

(65) Prior Publication Data

US 2001/0046537 A1 Nov. 29, 2001

(51) Int. Cl.$^7$ .................................................. A23L 3/10
(52) U.S. Cl. ....................... 426/407; 426/232; 426/233; 426/521; 422/3; 422/26; 422/109; 422/111; 422/307; 422/308
(58) Field of Search ................................. 426/233, 521, 426/232, 407; 422/3, 26, 109, 111, 307, 308

(56) References Cited

U.S. PATENT DOCUMENTS 3,326,692 A 6/1967 Martino et al.
4,345,145 A 8/1982 Norwood (List continued on next page.)

FOREIGN PATENT DOCUMENTS

EP 0302306 2/1989
EP 0497546 8/1992

OTHER PUBLICATIONS

Clausing, A. M., "Numerical methods in heat transfer". Lectures on Advance3d Heat Transfer University of Illinois, Urbana, Illinois, USA p. 157–181(1989).

(List continued on next page.)

Primary Examiner—N Bhat
(74) Attorney, Agent, or Firm—Dorsey & Whitney LLP; Stephen M. Knauer; Larry Mendenhall

(57) ABSTRACT

The present invention comprises a batch sterilization system, a controller for use in the batch sterilization system, and a method performed by the controller. The system, controller, and method are used to administer and provide on-line correction of a batch sterilization process performed on a batch of containers. The controller compiles an actual retort time-temperature profile during the batch sterilization process from the actual retort temperatures sensed by a sensor. While this is occurring, the controller controls a batch sterilizer so as to administer an initial portion of the batch sterilization process before a temperature deviation has begun according to a scheduled time-temperature profile. This temperature deviation is between the actual retort time-temperature profile and the scheduled processing time-temperature profile. In response to the temperature deviation, the controller defines a re-scheduled remaining time-temperature profile for a remaining portion of the batch sterilization process that begins when the temperature deviation clears. This is done by simulating the batch sterilization process based on the actual retort time-temperature profile. During the temperature deviation, the controller controls the batch sterilizer so as to administer corrections to clear the temperature deviation between the actual retort and re-scheduled remaining time-temperature profiles. When the temperature deviation has finally cleared, the controller controls the batch sterilizer so as to administer the remaining portion of the batch sterilization process according to the re-scheduled remaining time-temperature profile.

16 Claims, 15 Drawing Sheets

U.S. PATENT DOCUMENTS

| | | | |
|---|---|---|---|
| 4,437,159 A | | 3/1984 | Waugh |
| 4,608,260 A | | 8/1986 | Andre |
| 4,668,856 A | | 5/1987 | Axelson |
| 4,767,629 A | | 8/1988 | Iglesias et al. |
| 4,801,466 A | | 1/1989 | Clyne et al. |
| 4,849,235 A | | 7/1989 | Braymand |
| 4,962,299 A | | 10/1990 | Duborper et al. |
| 5,062,066 A | | 10/1991 | Scher et al. |
| 5,094,864 A | | 3/1992 | Pinon et al. |
| 5,111,028 A | | 5/1992 | Lee |
| 5,277,104 A | | 1/1994 | Colaner |
| 5,378,482 A | | 1/1995 | Kersten et al. |
| 5,410,129 A | | 4/1995 | Kersten et al. |
| 5,466,417 A | * | 11/1995 | Seki ........................... 422/109 |
| 5,526,736 A | | 6/1996 | Buriani et al. |
| 5,529,931 A | | 6/1996 | Narayan |
| 5,596,514 A | | 1/1997 | Maher, Jr. et al. |
| 5,619,911 A | | 4/1997 | Voegtlin |
| 5,652,006 A | | 7/1997 | Assinder et al. |
| 5,681,496 A | | 10/1997 | Brownlow |
| 5,826,496 A | | 10/1998 | Jara |
| 5,827,556 A | | 10/1998 | Maher, Jr. |
| 5,888,566 A | | 3/1999 | Alcaraz |
| 5,893,051 A | | 4/1999 | Tomohiro |
| 5,981,916 A | | 11/1999 | Griffiths et al. |
| 6,153,860 A | | 11/2000 | Weng |

OTHER PUBLICATIONS

Downing, D.L., "Canning of Marine Products", *A Complete Course in Canning and Related Processes, Book III*, p. 312–322, CTI Publications, Inc., Baltimore, MD (1996).

Weng, Z., U.S. Application No. 09/188,531, "Controller and Method for Administering and Providing On–Line Handling of Deviations in a Rotary Sterilization Process".

Weng, Z., U.S. Application No. 09/187,915, "Controller Method for Administering and Providing On–Line Handling of Deviations in a Hydrostatic Sterilization".

Zhao, Y., et al., "Computer Simulation on Onboard Chilling and Freezing of Albacore Tuna", *Journal of Food Science*, vol. 63(5): 751–755, (1998).

Erdoğdu, F., et al., "Modeling of Heat Conduction in Elliptical Cross Section: I. Development and Testing of the Model", *Journal of Food Engineering*, vol. 38, pp. 223–239, (1998).

Weng, Z., U.S. Application No. 09/560,637, "Controller and Method for Administering and Providing On–Line Handling of Deviations in a Continuous Oven Cooking Process".

Fahloul et al., "Measurements and Predictive Modelling of Heat Fluxes in Continuous Baking Ovens," Journal of Food Engineering, 26:469–479 (1995).

Huang et al., "Meatball Cooking–Modeling and Simulation," Journal of Food Engineering, 24:87–100 (1995).

Wang et al., "A Mathematical Model of Simultaneous Heat and Moisture Transfer during Drying of Potato," Journal of Food Engineering, 24:47–60 (1995).

Chen et al., "Modeling coupled heat and mass transfer for convection cooking of chicken patties," Journal of Food Engineering, 42:139–146 (1999).

Chang et al., "Modeling Heat Transfer During Oven Roasting of Unstuffed Turkeys," Journal of Food Science, 63(2):257–261 (1998).

Weng, Z., U.S. Application No. 09/632,150, "System, Controller, Computer Readable Memory, and Method for Precise On–line Control of Heat Transfer in a Food Preparation Process."

Teixeira, A.A., et al., "On–line retort control in thermal sterilization of canned foods", *Food Control*, vol. 8, No. 1. 1997, pp 13–20.

Gill, T.A., et al., Computerized Control Strategies for a Steam Retort, *Journal of Food Engineering*, vol. 10, 1989, pp. 135–154.

Abstract of Bichier, et al., "Thermal processing of canned foods under mechanical agitation", Asme Heat Transfer Div Publ HTD.; American Society of Mechanical Engineers, Heat Transfer Division; *Heat Transfer in Food Processing*, 1993.

Navankasattusas, S., et al., "Monitoring and Controlling Thermal Processes by On–line Measurement of Accomplished Lethality", *Food Technology*, Mar. 1978, pp. 79–83.

FMC FoodTech, "NumeriCAL On–Line™ for Batch Reports . . . " (1997).

FMC FoodTech, "FMC's NumeriCAL™ v.2.09" (1995).

FMC FoodTech, "FMC's NumeriCAL™ Model 101 Software" (1995).

FMC FoodTech, "BathCAL™ Thermal Processing Software" (1995).

Ball, C. O., et al., "Heating Curve–Simple Logarithmic Temperature Rise", in *Sterilization in food technology, Theory, Practice and Calculations*, Chap. 12:313–329.

Chang, S. Y., et al., "Heat Transfer and Simulated Sterilization of Particulate Solids in a Continuously Flowing System", *J. Food Sci.*, vol. 54(4):1017–1023 & 1030 (1989).

Clausing, A. M., "Numerical Methods in Heat Transfer", lectures on advanced heat transfer, 157–181 (1989).

Datta, A. K., et al., "Computer–based Retort Control Logic for On–Line Correction of Process Deviations", *J. Food Sci.*, 51(2):480–483 & 507 (1986).

Fastag, J., et al., "Variable Control of a Batch Retort and Process Simulation for Optimization Studies", *J. of Food Process Engg.*, 19:1–14 (Nov. 1996).

Giannoni–Succar, E. B., et al., "Correction Factor of Deviant Thermal Processes Applied to Packaged Heat Conduction Food", repr. from *J. Food Sci.*, 47(2):642–646 (1982).

Hayakawa, K., "Experimental Formulas for Accurate Estimation of Transient Temperature of Food and Their Application to Thermal Process Evaluation", repr. from *Food Technology*, 24(12):89–99 (1970).

Hayakawa, K., "Estimating Heat Processes in Canned Foods", *Ashrae Journal*, 17(9):36–37 (Sep. 1975); Author corrects errors, *Food Technol.*, 29(2):70 (1975).

Lanoiselle, J.–L., et al., "Predicting Internal Temperature of Canned Foods During Thermal Processing using a Linear Recursive Model", *J. Food Sci.*, 60(4):833–840 (1995).

Larkin, J. W., et al., "Experimental Errors Associated with the Estimation of Thermal Diffusivity from Thermal Process Data", *J. Food Sci.*, 52(2):419–428 (1987).

McConnell, J.E.W., "Effect of a Drop in Retort Temperature Upon the Lethality of Processes for Convection Heating Products", *Food Tech.*, 76–78 (Feb. 1952).

Manson, J. E., "Evaluating Complex Deviations–Hydrostatic Sterilizers", *TechniCAL, Inc.,* Chap. 12: 12.1–12.4.

Manson, J. E., "Evaluation of Lethality and Nutrient Retentions of Conduction–Heating Foods in Rectangular Containers", *Food Technology*, 24(11):109–113 (1970).

Navankasattusas, S., et al., "Monitoring and Controlling Thermal Processes by On–Line Measurement of Accomplished Lethality", *Food Technology*, 79–83 (Mar. 1978).

Denys, S., et al., "Evaluation of Process Deviations, Consisting of Drops in Rotational Speed, during Thermal Processing of Foods in Rotary Water Cascading Retorts", *J. Food Engg.*, 30:327–338 (1996).

Press, W. H., et al., "Parabolic Interpolation and Brent's Method in One Dimension", Chap. 10.2, Minimization or Maximization of Functions, 395–398.

Simpson, R., et al., "Computer Control of Batch Retort Process Operations", Food Processing Automation Conference (Proceedings), FPEI, ASAE, Lexington, KY (May 6–8, 1991).

Teixeira, A. A., et al., "Computer Control of Batch Retort Operations with On–Line Correction of Process Deviations", *Food Technology*, 85–90 (Apr. 1982).

Teixeira, A. A., et al., "Computer Optimization of Nutrient Retention in the Thermal Processing of Conduction–Heated Foods", *Food Technology*, vol. 23(845):137–142 (Jun. 1969).

Teixeira, A. A., "Innovative Heat Transfer Models: From Research Lab to On–Line Implementation", *Food Processing Automation II*, proceedings of the 1992 FPEI Conference, 177–184 (May 4–6, 1992).

Weng, Z., et al., "Computer Control of a Hydrostatic Sterilizer with On–Line Correction of Process Deviations", IFT 1986 presentation slides abstract (1986).

Weng, Z., et al., "Process Deviation Analysis of Conduction–Heating Canned Foods Processed in a Hydrostatic Sterilizer Using a Mathematical Model", *Journal Food Processing Automation IV*, vol. 41(6):368–379 (1995).

Weng, Z., et al., "The Use of a Time–Temperature–Integrator in Conjunction with Mathematical Modelling for Determining Liquid/Particle Heat Transfer Coefficients", *J. Food Engg.*, 16:197–214 (1992).

Young, K. E., et al., "Predicting Product Lethality in Hydrostatic Retorts", vol. 50:1467–1472 (1985).

Young, K. E., et al., "Product Temperature Prediction in Hydrostatic Retorts", *Transactions of the ASAE*, vol. 26(1):316–320 (1983).

Ball, C. O., "Foundation of Food Process Calculation Methods", Sterilization in Food Technology, 124–125.

* cited by examiner

US 6,472,008 B2

METHOD FOR ADMINISTERING AND PROVIDING ON-LINE CORRECTION OF A BATCH STERILIZATION PROCESS

TECHNICAL FIELD OF THE INVENTION

The present invention relates generally to controllers for administering batch sterilization processes. In particular, it pertains to such a controller that provides on-line correction of a batch sterilization process when a temperature deviation occurs during the process.

BACKGROUND OF THE INVENTION

Batch sterilization systems are widely used to sterilize shelf stable food products packaged in containers. In a typical batch sterilization system, a batch of these containers is placed inside the batch sterilizer of the system. Then, the controller of the system administers the batch sterilization process that is performed by the batch sterilizer on the batch of containers.

The batch sterilization process has come-up, processing, and cooling phases. These phases deliver a total lethality F to the batch of containers over a total time interval $[t_0, t_c]$ covering these phases, where $t_0$ is the begin time of the come-up phase and $t_c$ is the end time of the cooling phase. For purposes of this document, an open bracket [or] indicates that the corresponding time is included in the time interval while a closed bracket ( or ) indicates that the corresponding time is not included in the time interval. In order for the food product in the batch to be commercially sterilized, the total lethality actually delivered must satisfy a predefined target total lethality $F_{targtot}$ for the food product. The target total lethality may be set by the USDA (U.S. Department of Agriculture), the FDA (Food and Drug Administration), and/or a suitable food processing authority. Furthermore, some batch sterilization systems also include an optional requirement that the come-up and processing phases must deliver a heating lethality F to the batch over a heating time interval $[t_0, t_p]$ that meets a predefined target heating lethality $F_{targh}$ for the food product, where $t_p$ is the end time of the processing phase. In this case, the operator sets the target heating lethality on an individual basis for each batch sterilization process.

As is well known, the lethality F delivered to the batch over a particular time interval $[t_m, t_k]$ is given by the lethality equation:

$$Fo = \int_{t_m}^{t_k} 10^{(T_{CS}(t) - T_{REF})/z} dt$$

where $t_m$ and $t_k$ are respectively the begin and end times of the time interval $[t_m, t_k]$, $T_{cs}(t)$ is the product cold spot time-temperature profile of the product cold spot of the batch, z is the thermal characteristic of a particular microorganism to be destroyed in the sterilization process, and $T_{REF}$ is a reference temperature for destroying the organism. Thus, the heating lethality F delivered over the heating time interval $[t_0, t_p]$ is given by this lethality equation, where $t_m=t_0$ and $t_k=t_p$. Similarly, the total lethality F delivered to the product cold spot over the total time interval $[t_0, t_c]$ is also given by the lethality equation, but where $t_k=t_c$.

The time intervals $[t_0, t_p]$ and $[t_0, t_c]$ and the product cold spot time-time-temperature profile $T_{cs}(t)$ must be such that the target lethalities $F_{targh}$ and $F_{targtot}$ are met by the heating and total lethalities F over $[t_0, t_p]$ and F over $[t_0, t_c]$. In order to ensure that this occurs, various mathematical simulation models have been developed for simulating the product cold spot time-temperature profile $T_{cs}(t)$ over the come-up, processing, and cooling phases. These models include those described in Ball, C. O. and Olson, F. C. W., *Sterilization in Food Technology; Theory, Practice and Calculations*, McGraw-Hill Book Company, Inc., 1957; Hayakawa, K., *Experimental Formulas for Accurate Estimation of Transient Temperature of Food and Their Application to thermal Process Evaluation*, Food Technology, vol. 24, no. 12, pp. 89 to 99, 1970; *Thermobacteriology in Food Processing*, Academic Press, New York, 1965; Teixeira, A. A., Innovative Heat Transfer Models: From Research Lab to On-Line Implementation in *Food Processing Automation II*, ASAE, p. 177–184, 1992; Lanoiselle, J. L., Candau, Y., and Debray E., Predicting Internal Temperatures of Canned Foods During Thermal Processing Using a Linear Recursive Model, *J Food Sci.*, Vol. 60, No. 4, 1995; Teixeira, A. A., Dixon, J. R., Zahradnik, J. W., and Zinsmeister, G. E., Computer Optimization of Nutrient Retention in Thermal Processing of Conduction Heated Foods, *Food Technology*, 23:137–142, 1969; Kan-Ichi Hayakawa, Estimating Food Temperatures During Various Processing or Handling Treatments, *J. of Food Science*, 36:378–385, 1971; Manson, J. E., Zahradnik, J. W., and Stumbo, C. R., Evaluation of Lethality and Nutrient Retentions of Conduction-Heating Foods in Rectangular Containers, *Food Technology*, 24(11):109–113, 1970; Noronha, J., Hendrickx, M., Van Loeg, A., and Tobback, P., New Semi-empirical Approach to Handle Time-Variable Boundary Conditions During Sterilization of Non-Conductive Heating Foods, *J. Food Eng.*, 24:249–268, 1995; and the NumeriCAL model developed by Dr. John Manson of CALWEST Technologies, licensed to FMC Corporation, and used in FMC Corporation's LOG-TEC controller. A number of approaches have been developed for using these models to meet the target lethalities $F_{targh}$ and $F_{targtot}$.

Referring to FIG. 1, a conventional approach is to use such a simulation model only for off-line (i.e., prior to administering the batch sterilization process) definition of a scheduled total time-temperature profile $T_{sRT}(t)^0$ for the batch sterilization process. In this approach, the controller of the batch sterilization system uses the simulation model to simulate a scheduled product cold spot time-temperature profile $T_{cs}(t)^0$ that is predicted to occur over the come-up, processing, and cooling phases. This simulation is based on a pre-defined come-up time-temperature gradient $T_{uRT}(t)$, a scheduled processing retort temperature $T_{pRT}^0$, and a predefined cooling time-temperature gradient $T_{cRT}(t)$. The gradients $T_{uRT}(t)$ and $T_{cRT}(t)$ are based on heating and cooling temperature distribution tests conducted on the batch sterilizer and may include segments defined by endpoint temperatures and time durations.

The lethality equation described earlier is then used, where $t_m=t_0$ and $t_k=t_p^0$, $F=F^0$, and $T_{CS}(t)=T_{CS}(t)^0$, to compute a heating lethality $F^0$ that is predicted to be delivered over a scheduled heating time interval $[t_0, t_p^0]$ and is based on the scheduled product cold spot time-temperature profile $T_{CS}(t)^0$. Similarly, a total lethality $F^0$ that is predicted to be delivered over a scheduled total time interval $[t_0, t_c^0]$ is computed based on the profile $T_{CS}(t)^0$ using the lethality equation, except where $t_k=t_c^0$. As alluded to earlier, this is done so that the heating and total lethalities will meet the target lethalities $F_{targh}$ and $F_{targtot}$.

By simulating the scheduled product cold spot time-temperature profile $T_{CS}(t)^0$ and computing the scheduled heating and total lethalities $F^0$ over $[t_0, t_p^0]$ and $F^0$ over $[t_0,$ $t_c^0$] in this way, the controller defines the scheduled total time-temperature profile $T_{sRT}(t)^0$ for which the target lethalities $F_{targh}$ and $F_{targtot}$ are satisfied. This profile $T_{sRT}(t)_0$ includes come-up, processing, and cooling portions over scheduled come-up, processing, and cooling time intervals $[t_0, t_u^0]$, $(t_u^0, t_p^0]$, $(t_p^0, t_c^0]$, respectively. The come-up and cooling portions comprise the portions of the gradients $T_{uRT}(t)$ and $T_{cRT}(t)$ over the corresponding scheduled come-up and cooling time intervals $[t_0, t_u^0]$ and $(t_p^0, t_c^0]$, respectively. Similarly, the processing portion comprises the constant scheduled processing retort temperature $T_{pRT}^0$ over the scheduled processing time interval $(t_u^0, t_p^0]$.

Moreover, some of the simulation models, such as the earlier mentioned NumeriCAL model and the models described in the Teixeira et al., 1969 and Manson et al., 1970 references use finite differencing. In this case, the scheduled product cold spot time-temperature profile $T_{CS}(t)^0$ and the predicted heating and total lethalities $F^0$ over $[t_0, t_p^0]$ and $F^0$ over $[t_0, t_c^0]$ are incrementally and iteratively simulated and computed.

The controller then administers the batch sterilization process to be performed by the batch sterilizer according to the scheduled total time-temperature profile $T_{sRT}(t)^0$. However, a temperature deviation may occur during the processing phase. This occurs when the actual retort temperature $T_{aRT}(t_r)$ at each real sampling time $t_r$ during a deviation time interval $[t_d, t_e)$ is below the scheduled processing temperature $T_{pRT}^0$. In this case, the heating and total lethalities $F^0$ over $[t_0, t_p^0]$ and $F^0$ over $[t_0, t_c^0]$ will in fact be less than the target lethalities $F_{targh}$ and $F_{targtot}$.

In a conventional off-line scheduling approach, the controller has no means for on-line scheduling correction if a temperature deviation occurs. Thus, when such a deviation does occur, the operator is left with several undesirable options. The first option is to discard the batch entirely. However, this is wasteful and not necessary. The second option is to re-process the batch. This, however, will cause the food product in the batch to be over processed. And, the third option is to post process the recorded actual retort time-temperature profile $T_{aRT}(t)$ to determine whether the target lethalities $F_{targh}$ and $F_{targtot}$ have been satisfied. If they have not been satisfied, then the batch will be discarded or re-processed. If they have been satisfied, then the batch can be released for distribution. However, this is time consuming and, like the other options, wasteful and damaging to the food product.

In another approach, the controllers of the batch sterilization system is provided with conservative on-line scheduling correction capabilities. An example of such an approach is found in FMC Corporation's LOG-TEC controller which uses the NumeriCAL model mentioned earlier. Referring to FIG. 2, this controller computes a scheduled total time-temperature profile $T_{sRT}(t)^0$ off-line using the model in the manner just described. And, while still off line, the controller also uses the model to generate a correction table of re-scheduled remaining time-temperature profiles $T_{sRT}(t)^1$, $T_{sRT}(t)^2$, etc. This table is then used for on-line correction of the scheduled total time-temperature profile $T_{sRT}(t)^0$ in case a temperature deviation does occur during the processing phase.

In generating the correction table, the controller selects a re-scheduled processing retort temperature $T_{pRT}^1$ that is below the scheduled processing retort temperature $T_{pRT}^0$. The controller then defines a corresponding re-scheduled remaining time-temperature profile $T_{sRT}(t)^1$ over a re-scheduled remaining time interval $[t_u^1, t_c^1]$. The re-scheduled remaining time interval comprises re-scheduled heating and cooling time intervals $[t_0, t_p^1]$ and $[t_0, t_c^1]$. This is done in a similar manner to that just described. Thus, a product cold spot time-temperature profile $T_{CS}(t)^1$ is simulated that is based on the re-scheduled processing retort temperature $T_{pRT}^1$. From this product cold spot time-temperature profile, heating and cooling lethalities $F^1$ over $[t_0, t_p^1]$ and $F^1$ over $[t_0, t_c^1]$ are computed that satisfy the target heating and total lethalities $F_{targh}$ and $F_{targtot}$ and are predicted to be delivered over the re-scheduled heating and cooling time intervals. This entire process is then repeated for other re-scheduled processing retort temperature $T_{pRT}^2$, etc. to complete the correction table.

Then, if a temperature deviation occurs during the processing phase, the controller records the minimum actual retort temperature $T_{aRT}(t_{min})$ at a particular sampling time $t_{min}$ during the deviation time interval $[t_d, t_e)$. The controller then locates the closest re-scheduled processing retort temperature $T_{pRT}^1$ in the correction table that is equal to or just below the retort temperature $T_{aRT}(t_{min})$. The remainder of the processing phase is administered according to the re-scheduled remaining time-temperature profile $T_{sRT}(t)^1$ over the re-scheduled remaining time interval $[t_u^1, t_c^1]$.

However, this approach can still cause the food product to be over processed. This is due to the use of the minimum actual retort temperature $T_{aRT}(t_{min})$ during the temperature deviation for simulating the product cold spot time-temperature profile $T_{CS}(t)^1$. This simulation is overly conservative in that it disregards the fact that the actual retort time-temperature profile $T_{aRT}(t)$ was above the scheduled processing retort temperature $T_{pRT}$ over the time interval $[t_0, t_d)$ before the temperature deviation occurred. In other words, the portion of this product cold spot time-temperature profile over this time interval is overly conservative.

This means that, in the computation of the heating and total lethalities $F^1$ over $[t_0, t_p^1]$ and $F^1$ over $[t_0, t_c^1]$, full credit is not given to the lethality $F$ that was actually delivered to the product cold spot of the batch over the time interval $[t_0, t_d)$ prior to the temperature deviation. As a result, the re-scheduled heating and total time intervals $[t_0, t_p^1]$ and $[t_0, t_c^1]$ are overly conservative since they are based on the overly conservative product cold spot time-temperature profile $T_{CS}(t)^1$. The food product in the batch will therefore be over processed since the heating and total lethalities actually delivered to the batch will substantially surpass the target lethalities $F_{targh}$ and $F_{targtot}$, respectively.

Another disadvantage of this approach is that the minimum actual retort temperature $T_{aRT}(t_{min})$ during the temperature deviation may be lower than any of the re-scheduled processing retort temperatures $T_{pRT}^1$, $T_{pRT}^2$, etc. in the correction table. In this case, the on-line scheduling correction just described will not be available. The operator of the batch sterilization system will then be only left with the options described earlier for the off-line scheduling approach.

In view of this, a new approach has been recently developed for on-line definition of the heating and total time intervals $[t_0, t_p]$ and $(t_p, t_c]$ using a finite difference simulation model. This approach is described in Teixeira, A. A. and Tucker, G. S., On-Line Retort Control in Thermal Sterilization of Canned Foods, *Food Control,* 8(3):13–20, 1997; Simpson, R., Almonacid S., and Torres, J.A., Computer Control of Batch Retort Process Operations, *Food Processing Automation I*, ASAE, 1991; Teixeira, A. A. and Manson, J. E., Computer Control of Batch Retort Operations with On-Line Correction of Process Deviations, *Food Technology,* p. 85–90, April 1982; and Datta, A. K., Teixeira, A. A., and Manson, J. E., Computer-based Retort Control Logic for On-Line Correction of Process Deviations, *J. Food Sci.*, 51(2):480–483 and 507, 1986. This approach will also be discussed next to provide a better understanding of the differences between this approach and the approach used in the invention disclosed herein.

Referring to FIG. 3, in the on-line definition approach, the controller causes the batch sterilization process to begin without defining a scheduled total time-temperature profile $T_{sRT}(t)^0$ or a correction table. The come-up and processing phases are administered according to the pre-defined come-up time-temperature gradient $T_{uRT}(t)$ and the scheduled processing retort temperature $T_{pRT}$. While these phases are being administered, the controller simulates for each current real sampling time $t_r$ the portion of a product cold spot time-temperature profile $T_{CS}(t)$ that has actually occurred over the time interval $[t_0, t_r]$. This is done based on the actual retort temperature $T_{aRT}(t_r)$ measured at each real sampling time $t_r$ of the processing phase. From this portion of the cold spot time-temperature profile, the controller computes the heating lethality F actually delivered to the batch over the time interval $[t_0, t_r]$. This is done on-line at each real sampling time $t_r$ of the come-up and processing phases according to the lethality equation described earlier, where $t_m = t_0$ and $t_k = t_r$. The controller then determines whether this heating lethality satisfies the target heating lethality $F_{targh}$. If it does not, then the process is repeated for the next real sampling time $t_r + \Delta t_r$, where $\Delta t_r$ is a pre-defined sampling period.

If the target heating lethality $F_{targh}$ is satisfied, then the controller uses the simulation model to simulate the portion of the product cold spot time-temperature profile $T_{CS}(t)$ that is predicted to occur over the cooling phase beginning at the current real sampling time $t_r$. This is done while the controller is still on-line at the time $t_r$. In doing so, the controller first defines a predicted cooling time-temperature profile $T_{sRT}(t)$ by shifting the cooling time-temperature gradient $T_{cRT}(t)$ so that it starts at the actual retort temperature $T_{aRT}(t_r)$ at the time $t_r$ and occurs over a predicted cooling time interval $[t_r, t_r + \Delta t_c]$, where $\Delta t_c$ is the time duration of the predicted cooling time-temperature profile.

Moreover, while still on-line at the current real sampling time $t_r$, the controller computes a total lethality F predicted to be delivered over a predicted total time interval $[t_0, t_r + \Delta t_c]$. This is done by computing a cooling lethality F predicted to be delivered to the batch over the predicted cooling time interval $[t_r, t_r + \Delta t_c]$ and adding it to the actually delivered heating lethality F over $[t_0, t_r]$. The predicted cooling lethality is computed according to the lethality equation, where $t_m = t_r$ and $t_k = t_r + \Delta t_c$, by using the portion of the product cold spot time-temperature profile $T_{CS}(t)$ predicted to occur over the time interval $[t_r, t_r + \Delta t_c]$. If the predicted total lethality does not satisfy the target total lethality $F_{targtot}$, then the controller repeats the entire process for the next real sampling time $t_r + \Delta t_r$.

If the target total lethality $F_{targtot}$ is satisfied, then the controller defines the time $t_r$ as the actual processing end time $t_p$ and the time $t_r + \Delta t_c$ as the scheduled cooling end time $t_c$. This means that the processing phase was administered over the actual processing time interval $(t_u, t_p]$. The controller then administers the cooling phase according to the now scheduled cooling time-temperature profile $T_{sRT}(t)$ over the correspondingly scheduled cooling time interval $(t_p, t_c]$.

As discussed earlier, the on-line definition approach just described requires use of a finite difference simulation model. Such a model is required to accurately simulate the portion of the product cold spot time-temperature profile $T_{CS}(t)$ that actually occurs over each real time increment $[t_r - \Delta t_r, t_r]$ of the processing phase using the actual retort temperature $T_{aRT}(t_r)$ measured at the real sampling time $t_r$. And, similar to the other approaches already described, this model can also be used to accurately simulate the portion of the product cold spot time-temperature profile $T_{CS}(t)$ predicted to occur over each simulation time increment $[t_s - \Delta t_r, t_s]$ of the cooling phase using the cooling retort temperature $T_{cRT}(t_s)$ at the simulation sampling time $t_s$.

A disadvantage to this on-line definition approach is that the definition of the processing and cooling end times $t_p$ and $t_c$ is open ended. In other words, the operator and the controller do not know the end times $t_p$ and $t_p$ in advance. This makes it difficult for an operator to comply with current FDA and/or USDA regulatory requirements in filing the batch sterilization process with the FDA and/or USDA.

Another disadvantage of this approach is that the product cold spot temperature profile $T_{CS}(t)$ must be simulated over each real time increment $[t_{r-\Delta t_r}, t_r]$ and the heating lethality F over the time interval $[t_0, t_r]$ must be computed at each real sampling time $t_r$ of the processing phase. This makes the approach computationally intensive and difficult to implement.

SUMMARY OF THE INVENTION

In summary, the present invention comprises a batch sterilization system, a controller for use in the batch sterilization system, and a method performed by the controller. The system, controller, and method are used to control and provide on-line correction of a batch sterilization process performed on a batch of containers. In addition to the controller, the batch sterilization system includes a batch sterilizer to perform the batch sterilization process on the batch of containers. The system also includes a sensor to sense actual retort temperatures in the batch sterilizer during the batch sterilization process.

The controller first defines a scheduled time-temperature profile for the batch sterilization process. The controller then compiles an actual retort time-temperature profile during the batch sterilization process from the actual retort temperatures sensed by the sensor. Before a temperature deviation has begun, the controller controls the batch sterilizer so as to administer an initial portion of the batch sterilization process before the temperature deviation has begun according to the scheduled time-temperature profile. The temperature deviation is between the actual retort time-temperature profile and a scheduled processing time-temperature profile.

In response to the temperature deviation, the controller defines a re-scheduled remaining time-temperature profile for a remaining portion of the batch sterilization process that begins when the temperature deviation clears. This is done by simulating the batch sterilization process based on the actual retort time-temperature profile. Furthermore, during the temperature deviation, the controller controls the batch sterilizer so as to administer corrections to clear the temperature deviation between the actual retort and re-scheduled remaining time-temperature profiles.

When the temperature deviation has finally cleared, the controller controls the batch sterilizer so as to administer the remaining portion of the batch sterilization process. This is done according to the re-scheduled remaining time-temperature profile.

DETAILED DESCRIPTION OF THE INVENTION

Figure 1:
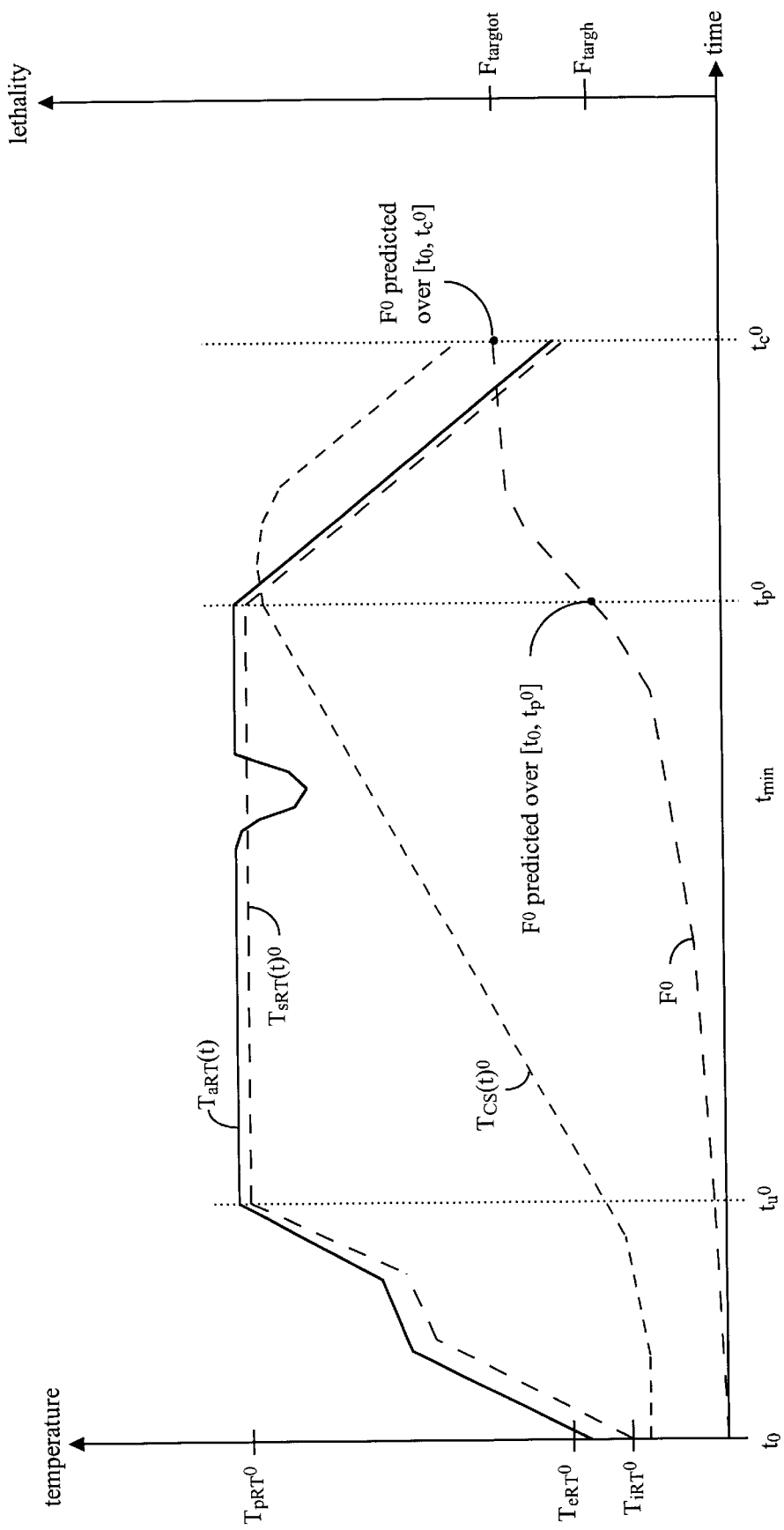
FIGS. 1 to 3 are timing diagrams of prior art approaches to controlling and providing on-line correction of a batch sterilization process.
Figure 2:
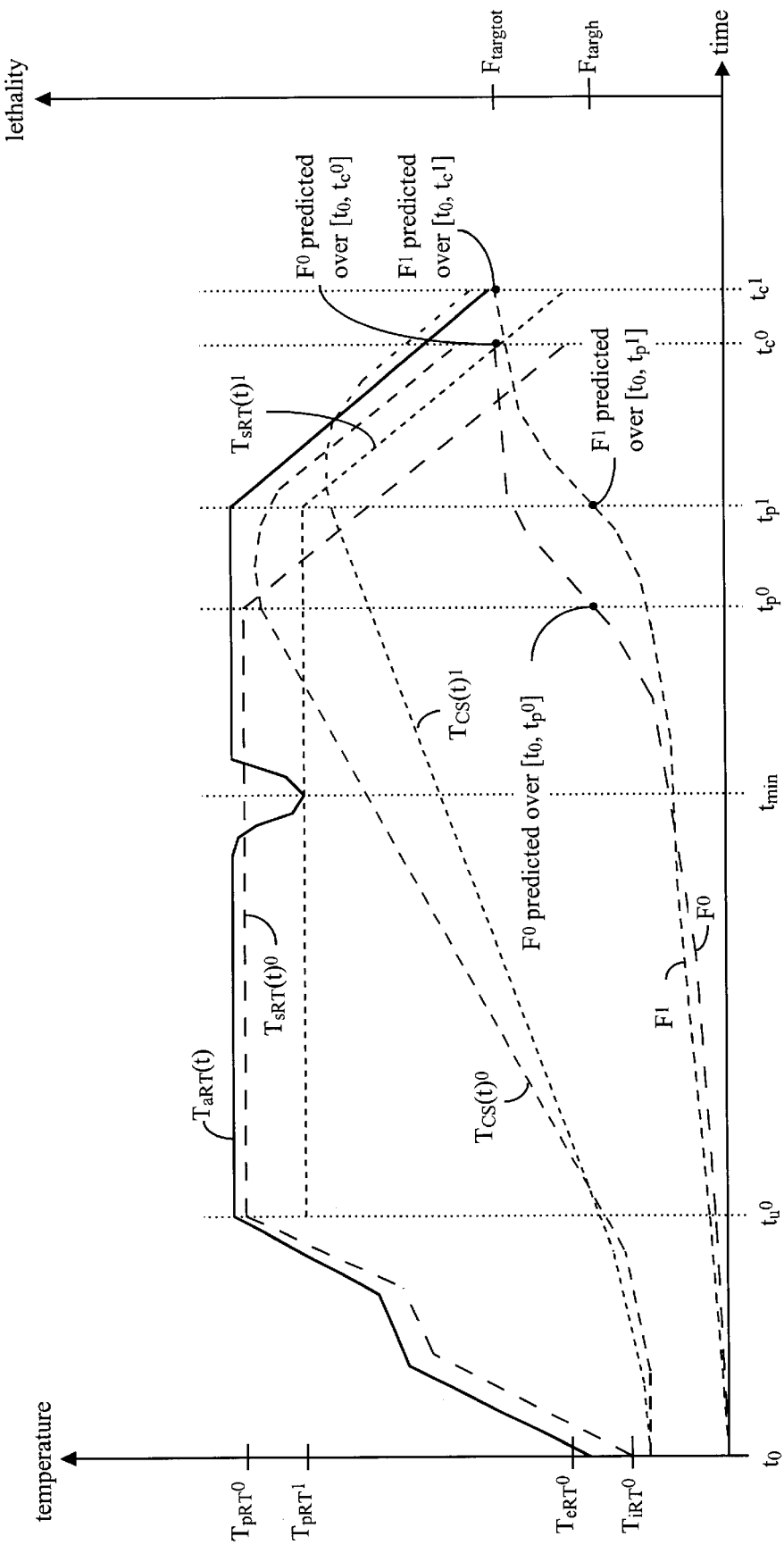
Figure 3:
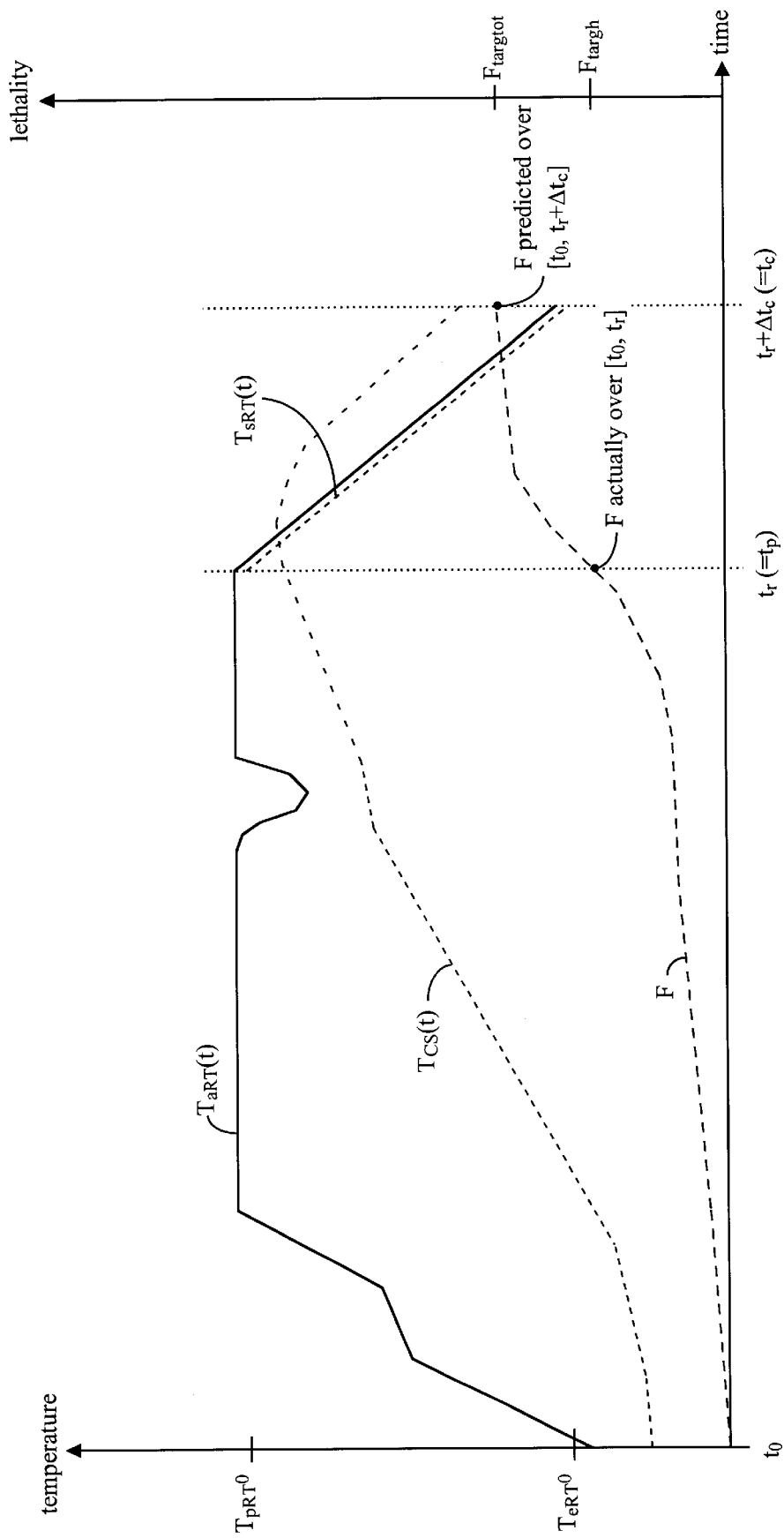
Figure 4:
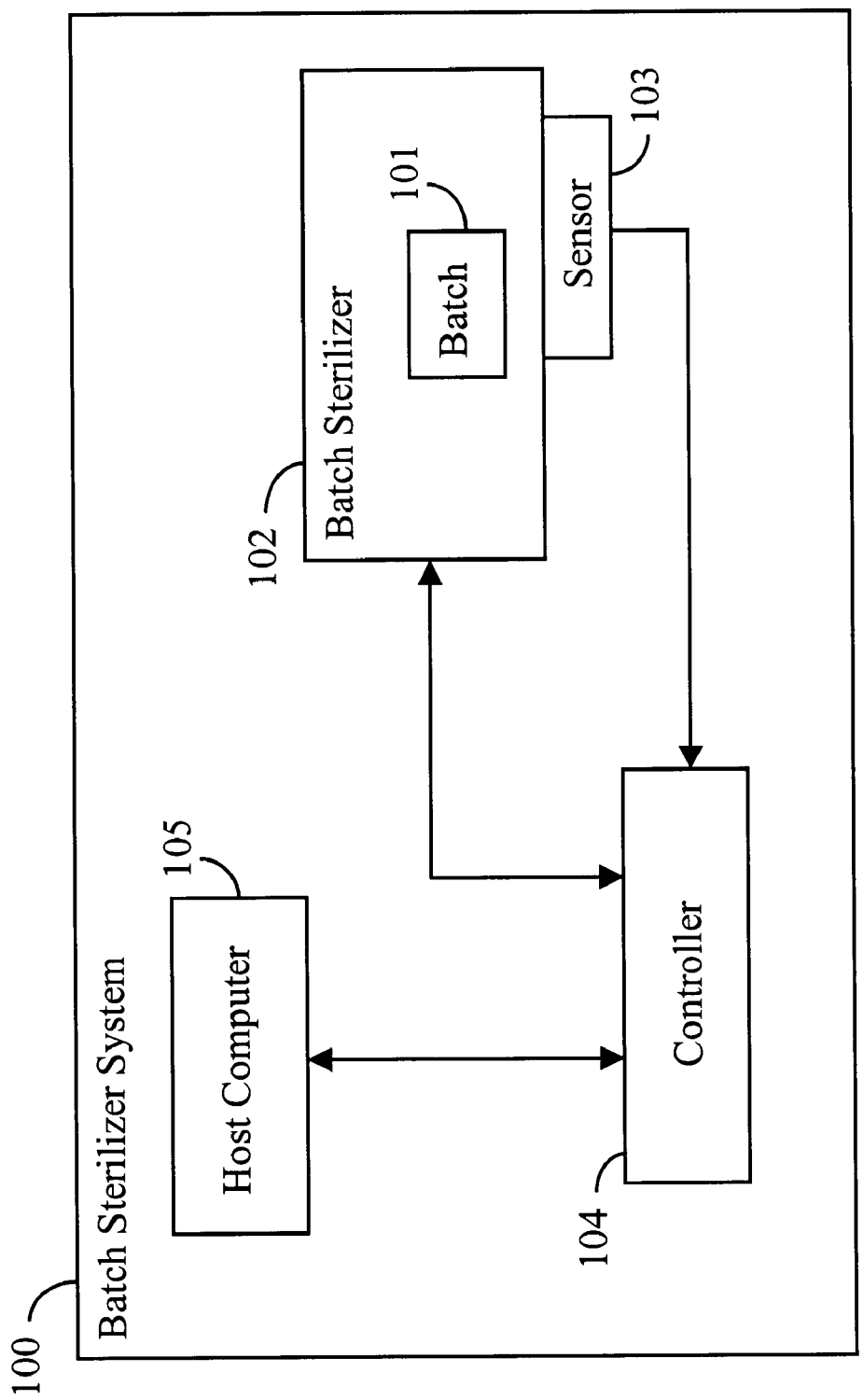
FIG. 4 is a block diagram of a batch sterilization system in accordance with the present invention.

Referring to FIG. 4, there is shown a batch sterilization system 100 for performing a batch sterilization process on a batch 101 of containers that contain a food product. The system comprises a batch sterilizer 102, a retort temperature sensor 103, a programmed controller 104, and a host computer 105. The controller controls and provides on-line correction of the process by controlling the batch sterilizer. This is done in response to the actual retort time-temperature profile $T_{aRT}(t)$ in the batch sterilizer that is sensed with the retort temperature sensor 103 and compiled by the controller. The host computer is used to provide input information, namely input parameters and software, used by the controller in controlling the process. The host computer is also used to receive, process, and display output information about the process which is generated by the controller.

1. Hardware and Software Configuration of Controller 104

Figure 5:
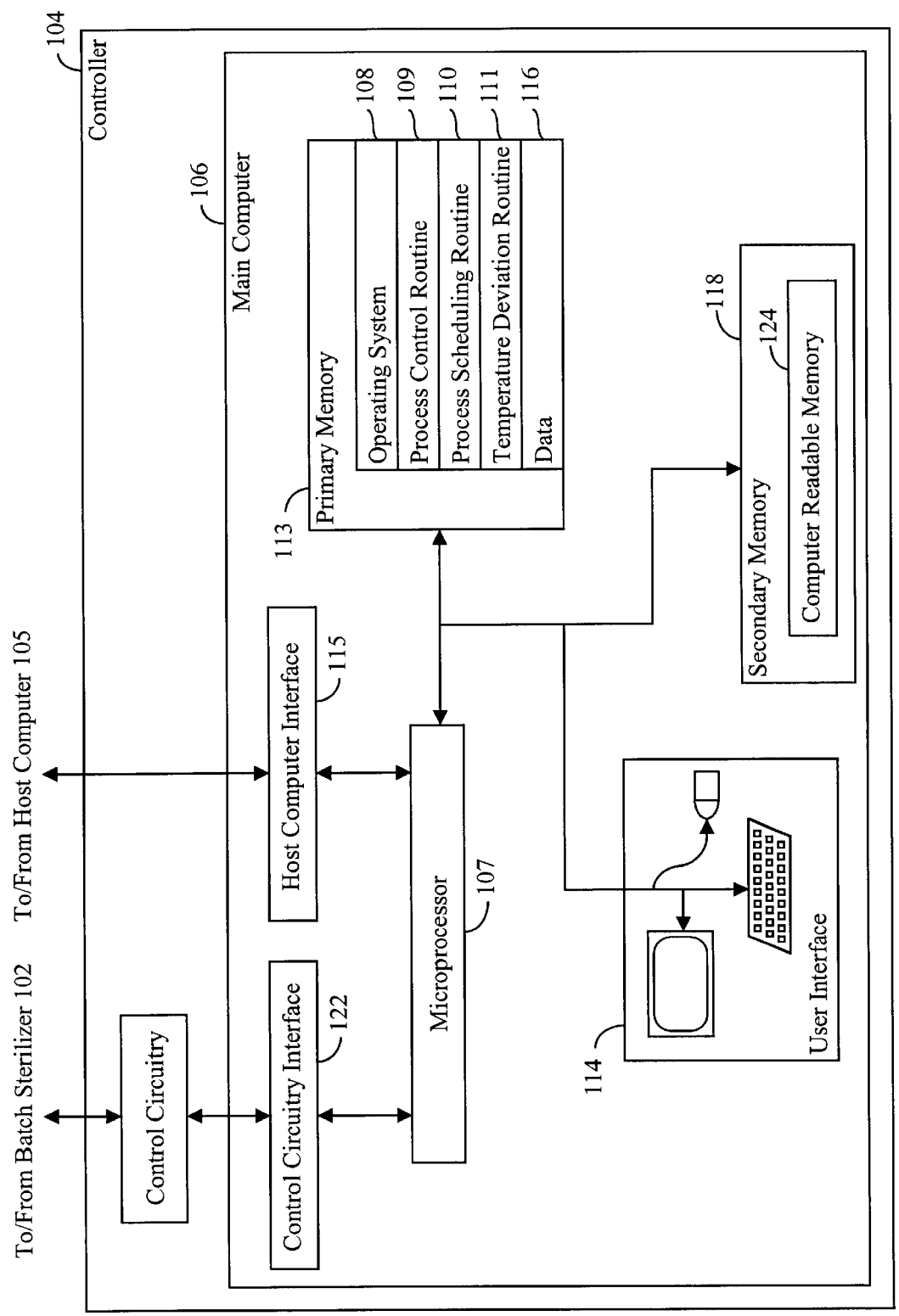
FIG. 5 is a block diagram of a controller of the batch sterilization system of FIG. 4.

Referring to FIG. 5, the controller 104 comprises a main control computer 106 that includes a microprocessor (i.e., CPU) 107, a primary memory 113, and a secondary memory 118. The microprocessor executes an operating system 108, a process control program 109, a process scheduling program 110, and a temperature deviation program 111 of the controller. The operating system and programs are loaded from the secondary memory into the primary memory during execution.

The operating system 108 and the programs 109 to 111 are executed by the microprocessor 107 in response to commands issued by the operator. These commands may be issued with a user interface 114 of the main control computer 106 and/or the host computer 105 via a host computer interface 115 of the controller 104. The operating system controls and coordinates the execution of the programs 109 to 111. Data 116 generated by the operating system and the programs during execution and data 116 inputted by the operator is stored in the primary memory 113. This data includes input information provided by the operator with the user interface and/or the host computer via the host computer interface. It also includes output information that is to be displayed to the operator and provided to the user interface or the host computer via the host computer interface.

The controller 104 also comprises control circuitry 117. The control circuitry includes circuits, microprocessors, memories, and software to control the batch sterilization process by generating control signals that control the sequential operation of the batch sterilizer 102. As alluded to earlier, the software may be downloaded from the host computer 105 and provided to the control circuitry by the process control program 109. The control signals are generated in response to commands generated by the process control program and issued to the control circuitry from the microprocessor 107 via the control circuitry interface 122.

Furthermore, at each real sampling time $t_r$ of the batch sterilization process, the control circuitry 117 receives sensor signals from the retort temperature sensor 103 that represent the actual retort temperature $T_{aRT}(t_r)$ sensed by this sensor. The control circuitry generates the control signals for controlling the batch sterilizer 102 in response to the sensed actual retort temperature. The sensed actual retort temperature is also provided to the microprocessor 107 via the control circuitry interface 122 and recorded by the process control program 109 as data 116 in the primary memory 113. In this way, the process control program compiles and records the actual retort time-temperature profile $T_{aRT}(t)$ in the primary memory. This profile is used in the manner described later for providing on-line correction of the batch sterilization process.

The sensor 103 is preferably located in the slowest heating zone of the batch sterilizer 102 to provide a conservative estimate of the actual retort temperature $T_{aRT}(t_r)$. However, if this is not possible, the process control program 109 may adjust the temperature provided by the sensor to estimate the actual retort temperature at the slowest eating zone. This adjustment would be done according to temperature distribution tests conducted on the batch sterilizer.

As mentioned earlier, the operating system 108 and the programs 109 to 111 are normally stored in the secondary memory 118 and then loaded into the primary memory 113 during execution. The secondary memory comprises a computer readable memory 124 that is readable by the main control computer 106 of the controller 104. This computer readable memory is therefore used to direct the controller in controlling and providing on-line correction of the batch sterilization process. The computer readable memory may comprise a PROM (programmable read only memory) that stores the operating system and/or programs. Alternatively or additionally, the computer readable memory may comprise a magnetic or CD ROM storage disc that stores the operating system and/or programs. The computer readable memory in this case is readable by the main control computer with a magnetic or CD ROM storage disk drive of the secondary memory. Moreover, the operating system and/or programs could also be downloaded to the computer readable memory or the primary memory from the host computer 105 via the host computer interface 115.

2. Example Embodiment

In an exemplary embodiment, the controller 104 controls the batch sterilization process according to the flow and timing diagrams of FIGS. 6 to 12. In doing so, a finite difference simulation model is used by the process scheduling and temperature deviation programs 110 and 111 to simulate the product cold spot time-temperature profile $T_{CS}(t)$ of the batch 101 of containers being processed. This model may be the earlier mentioned NumeriCAL model and used for both conduction heated food products and convection heated food products. Or, it may be one of the models described in the Teixeira et al., 1969 and Manson et al., 1970 references and used for conduction heated food products. As will be evident from the foregoing discussion, the novelty of the invention described herein is not in which model is used, but in the manner in which it is used according to the flow and timing diagrams in FIGS. 6 to 12.

2.a. Overall Process Flow

Figure 6A:
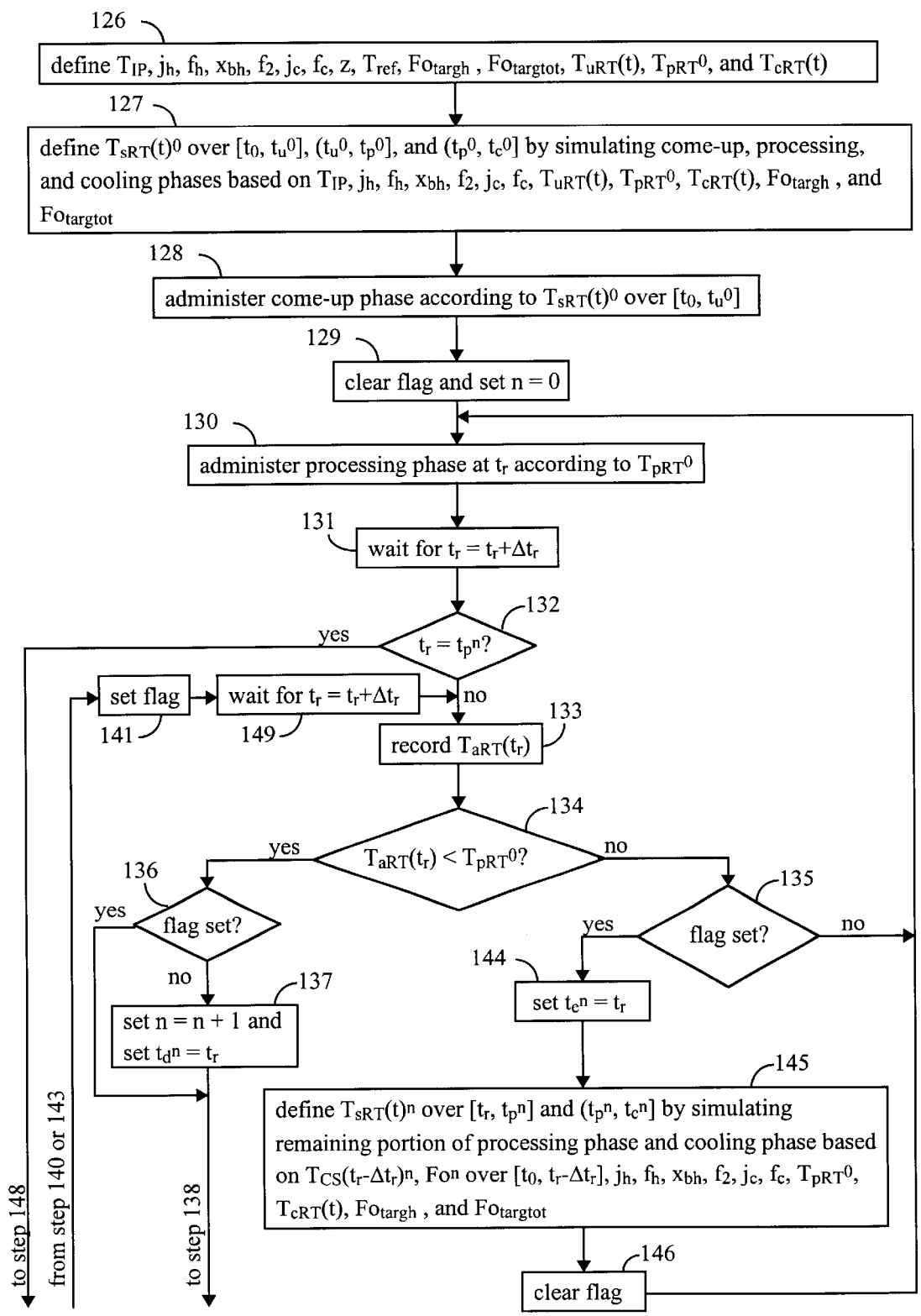
FIG. 6 is an overall process flow diagram for one embodiment of the controller of FIG. 5 in controlling and providing on-line correction of a batch sterilization process.
Figure 6B:
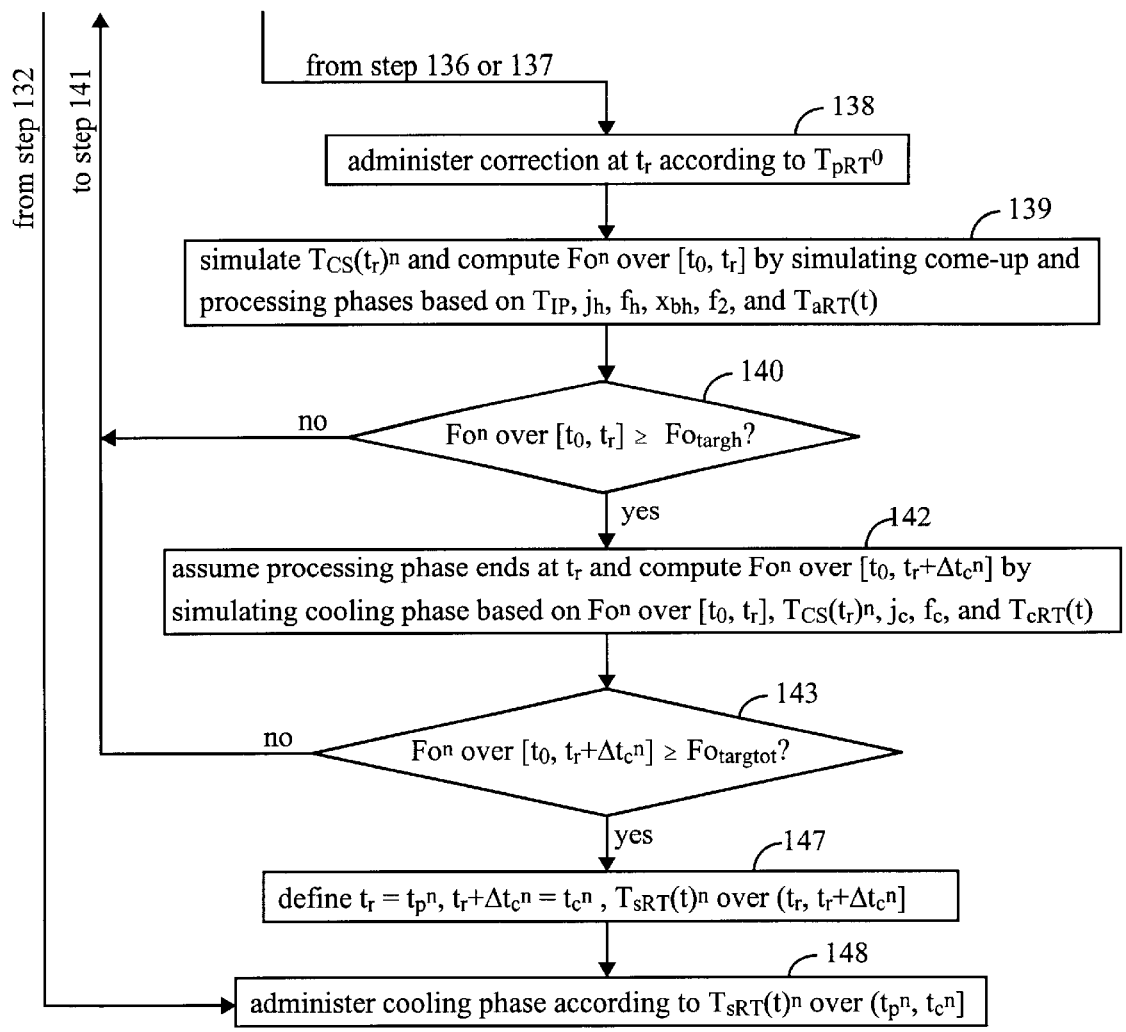
Figure 6:
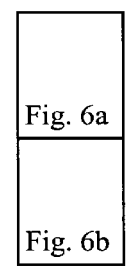

In the first step 126 of the overall process flow of FIG. 6, the input parameters for the batch sterilization process are defined and provided to the controller 104. The input parameters include a predefined sampling time period $\Delta t_r$ (e.g., .0.1 to 1 second) for each real time increment $[t_r-\Delta t_r, t_r]$ from the previous real sampling time $t_r-\Delta t_r$ to the current real sampling time $t_r$ during the process. These input parameters also include the initial product temperature $T_{IP}$ for the food product in the containers of the batch 101 being processed. The initial product temperature $T_{IP}$ is manually measured by the operator by using one of the containers of the batch as a sample. The input parameters also include the traditional heating and cooling factors $j_h$, $f_h$, $X_{bh}$, $f_2$, $j_c$, and $f_c$ to be used in the simulation model. The heating factors $j_h$, $f_h$, $X_{bh}$, and $f_2$ are respectively the heating time lag factor, the heating curve slope factor, the broken heating time factor, and the broken heating curve slope factor that are pre-defined for the food product. Similarly, the cooling factors $j_c$ and $f_c$ are respectively the cooling time lag factor and the cooling curve slope factor that are also pre-defined for the food product. The input parameters further include the earlier discussed thermal characteristic z for destroying a particular microorganism in the food product and the associated reference temperature $T_{REF}$. Also included in the input parameters are the earlier discussed target lethalities $F_{targh}$ and $F_{targtot}$. Finally, the input parameters include the earlier discussed scheduled processing retort temperature $T_{pRT}$ and the earlier discussed pre-defined come-up and cooling time-temperature gradients $T_{uRT}(t)$ and $T_{cRT}(t)$ for the batch sterilizer 102.

In order to perform step 126, the operator issues commands with the user interface 114 and/or the host computer 105 to invoke the process control program 109. Then, the operator enters the input parameters $T_{IP}$, $j_h$, $f_h$, $X_{bh}$, $f_2$, $j_c$, $f_c$, $T_{uRT}(t)$, $T_{cRT}(t)$, and $T_{pRT}^0$ with the user interface and/or the host computer. The process control program loads the entered input parameters into the primary memory 113 for use by the programs 109 to 111. The execution of these programs is controlled and coordinated by the process control program in the manner discussed next.

The process control program 109 first invokes the process scheduling program 110. In step 127, the process scheduling program simulates the entire batch sterilization process to define a scheduled total time-temperature profile $T_{sRT}(t)^0$ over a scheduled total time interval $[t_0, t_c^0]$. This is simulation covers the come-up, processing, and cooling phases of the process. Therefore, the profile $T_{sRT}(t)^0$ has come-up, processing, and cooling portions that are predicted to respectively occur over scheduled come-up, processing, and cooling time intervals $(t_0, t_u^0]$, $(t_u^0, t_p^0]$, and $(t_p^0, t_c^0]$. The come-up portion comprises the portion of the come-up time-temperature gradient $T_{uRT}(t)$ over the time interval $(t_0, t_u^0]$ and between an initial retort temperature $T_{iRT}$ and the scheduled processing retort temperature $T_{pRT}^0$. The processing portion comprises the temperature $T_{pRT}^0$ over the time interval $(t_u^0, t_p^0]$. And, the cooling portion comprises the portion of the cooling time-temperature gradient $T_{cRT}(t)$ over the time interval $(t_p^0, t_c^0]$ and between the temperature $T_{pRT}^0$ and an ending retort temperature $T_{eRT}$. The precise manner in which step 127 is performed is discussed in greater detail in section 2.b., but will be briefly discussed next The scheduled total time-temperature profile $T_{sRT(t)}^0$ is defined by using the simulation model mentioned earlier. Specifically, the process scheduling program 110 model is used to iteratively and incrementally simulate a scheduled product cold spot time-temperature profile $T_{CS}(t)^0$ that is predicted to occur during the batch sterilization process. This simulation is based on the input parameters $T_{IP}$, $j_h$, $f_h$, $X_{bh}$, $f_2$, $j_c$, $f_c$, $T_{uRT}(t)$, $T_{pRT}^0$, and $T_{cRT}(t)$.

The process scheduling program 110 also iteratively and incrementally computes a lethality $F^0$ that is predicted to be delivered to the batch 101 during the batch sterilization process. In doing so, the program 110 computes a heating lethality $F^0$ that satisfies the target heating lethality $F_{targh}$ and is predicted to be delivered over a scheduled heating time interval $[t_0, t_p^0]$ covering just the come-up and processing phases. This computation is made based on the portion of the product cold spot time-temperature profile $T_{CS}(t)^0$ over the time interval $[t_0, t_p^0]$ and the input parameters z and $T_{REF}$. Furthermore, the lethality equation described earlier is used to make this computation, where $t_m=t_0$, $t_k=t_p^0$, $T_{CS}(t)=T_{CS}(t)^0$, and $F=F^0$. The come-up and processing portions of the scheduled total time-temperature profile $T_{sRT}(t)^0$ on which the portion of the profile $T_{CS}(t)^0$ over the time interval $[t_0, t_p^0]$ is based are defined as a result.

Similarly, the process scheduling program 110 also iteratively and incrementally computes a total lethality $F^0$ that satisfies the target total lethality $F_{targtot}$ and is predicted to be delivered over a scheduled total time interval $[t_0, t_c^0]$ covering the entire batch sterilization process. The lethality equation is also used in this computation, but where $t_k=t_c^0$. The predicted total lethality is computed based on the portion of the product cold spot time-temperature profile $T_{CS}(t)^0$ over a scheduled cooling time interval $(t_p^0, t_c^0]$, the predicted heating lethality $F^0$ over $[t_0, t_p^0]$, and the input parameters z and $T_{REF}$. The predicted total lethality $F^0$ over $[t_0, t_c^0]$ is in fact the sum of the predicted heating lethality $F^0$ over $[t_0, t_p^0]$ and a cooling lethality $F^0$ predicted to be delivered to the batch 101 over the scheduled cooling time interval $(t_p^0, t_c^0]$. In this way, the cooling portion of the scheduled total time-temperature profile $T_{sRT}(t)^0$ on which the portion of the profile $T_{CS}(t)^0$ over the time interval $(t_p^0, t_c^0]$ is based is also defined.

Figure 7:
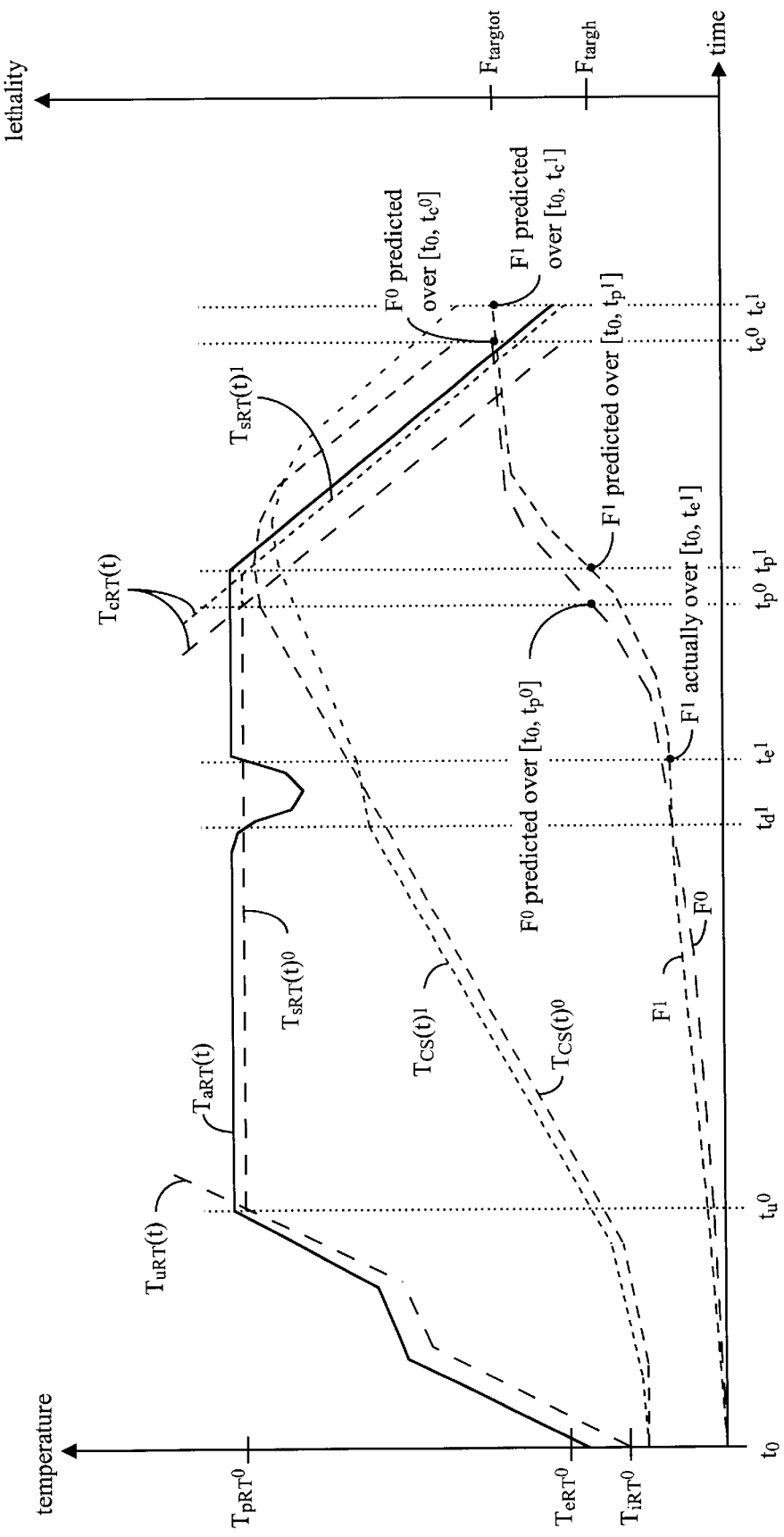
FIGS. 7 and 8 are timing diagrams for the overall process flow of FIG. 6.

Referring now to both FIGS. 6 and 7, the process control program 109 then causes the come-up phase in step 128 to be administered by the control circuitry 117. The control circuitry does so in accordance with the come-up portion of the scheduled total time-temperature profile $T_{sRT}(t)^0$ by appropriately controlling the batch sterilizer 102. This means that the actual retort time-temperature profile $T_{aRT}(t)$ is brought up along the come-up portion of the profile $T_{sRT}(t)^0$ over the scheduled come-up time interval $[t_0, t_u^0]$. More specifically, the control circuitry controls the batch sterilizer and monitors the sensed actual retort temperature $T_{aRT}(t_r)$ at each real sampling time $t_r$ to make sure that this temperature stays at least equal to the corresponding scheduled come-up retort temperature $T_{sRT}(t_r)^0$ for that time. The temperature $T_{sRT}(t_r)^0$ is obtained from the profile $T_{sRT}(t)^0$.

After the come-up phase has been administered, the process control program 109 controls the administration of the processing phase in steps 130 to 149 of FIG. 6. In doing so, it first clears a deviation flag and sets a deviation counter n to zero in step 129 of the flow diagram. The flag is used to indicate whether or not a temperature deviation is occurring and the counter n is used to identify each temperature deviation that does occur.

Then, at the current real sampling time $t_r$, it causes the control circuitry 117 in step 130 to administer the processing phase at the scheduled processing retort temperature $T_{pRT}^0$. In administering the processing phase at the time $t_r$, the control circuitry appropriately controls the batch sterilizer 102 and monitors the actual retort time-temperature profile $T_{aRT}(t)$ to verify that it is at least equal to the temperature $T_{pRT}^0$. In this embodiment of the controller 104, the scheduled processing retort temperature $T_{pRT}^0$ will remain the same throughout the processing phase regardless if a temperature deviation occurs.

Then the process control program 109 waits for the next real sampling time $t_r=t_r+\Delta t_r$ in step 131. In step 132, the process control program determines whether the processing phase is over. Since the deviation counter n has been initially set to zero in step 129, this is done initially until the first temperature deviation occurs by determining whether the current real sampling time $t_r$ is the scheduled processing end time $t_p^0$. In this embodiment of the controller 104, the processing end time $t_p^n$ scheduled in response to the nth temperature deviation is re-scheduled (i.e., re-defined) whenever the (n+1)th temperature deviation occurs. This will be explained in greater detail later.

In step 133, the process control program 109 records the actual retort temperature $T_{aRT}(t_r)$ at the current real sampling time $t_r$. In this way, the actual retort time-temperature profile $T_{aRT}(t)$ is compiled.

Then, in step 134, the process control program 109 determines whether a temperature deviation is occurring at the current real sampling time $t_r$. In doing so, the program monitors the actual retort time-temperature profile $T_{aRT}(t)$ to determine if the actual retort temperature $T_{aRT}(t_r)$ at the time is less than the scheduled processing temperature $T_{pRT}^0$. Since the deviation counter n is initially set to zero, the program is actually determining whether the deviation is occurring between the actual retort time-temperature profile and the processing portion of the scheduled total time-temperature profile $T_{sRT}(t)^0$.

If no deviation is occurring and the process control program 109 determines in step 135 that the deviation flag is cleared, then it returns to step 130. Steps 130 to 135 are then repeated until it is determined in step 132 that the processing phase is over or it is determined in step 134 that a temperature deviation is occurring.

If the process control program 109 does determine in step 134 that a temperature deviation is occurring, it then determines in step 136 whether the deviation flag is set. If it is not, this means that the deviation has just begin at the current real sampling time $t_r$. In this case, the deviation counter n is incremented to one to identify the first deviation and the time $t_r$ is recorded as the deviation begin time $t_d^1$ in step 137. If the deviation flag is set in step 136, then the deviation has already begun and was previously detected in step 134 before the time $t_r$. In this case, the program proceeds to step 138.

As alluded to earlier, the control circuitry 117 monitors the actual retort temperature $T_{aRT}(t_r)$ at the current real sampling time $t_r$. Therefore, in step 138, the control circuitry administers at this time a correction according to the scheduled processing retort temperature $T_{pRT}^0$. This is done by appropriately controlling the batch sterilizer 102 to eventually bring the actual retort temperature up to at least the temperature $T_{pRT}^0$.

Then, the process control program 109 invokes the temperature deviation program 111. In step 139, the invoked program computes a heating lethality $F^1$ actually delivered to the product cold spot of the batch 101 over the expired time interval $[t_0, t_r]$. This is done by simulating the portion of the batch sterilization process that was actually administered over this time interval. This portion includes the come-up phase and the portion of the processing phase actually administered prior to and including the time $t_r$.

In performing this simulation, the simulation model mentioned earlier is used to iteratively and incrementally simulate the portion of a product cold spot time-temperature profile $T_{CS}(t)^1$ that actually occured over the expired time interval $[t_0, t_r]$. This simulation is based on the input parameters $T_{IP}$, $j_h$, $f_h$, $X_{bh}$, and $f_2$ and the actual retort time-temperature profile $T_{aRT}(t)$ over the time interval $[t_0, t_r]$. From this portion of the profile $T_{CS}(t)^1$ and the input parameters z and $T_{REF}$, the program 110 iteratively and incrementally computes the heating lethality $F^1$ actually delivered over the time interval $[t_0, t_r]$. This is done using the lethality equation described earlier, where $t_0=t_m$, $t_r=t_k$, $T_{CS}(t)^1=T_{CS}(t)$, and $F^1=F$. The precise manner in which step 139 is performed is discussed in greater detail in section 2.c.

In step 140, the temperature deviation program 111 determines whether the actual heating lethality $F^1$ over $[t_0, t_r]$ satisfies the target heating lethality $F_{targh}$. If it does not, then this means that the processing phase must continue in order to properly deliver the target heating lethality $F_{targh}$ to the batch 101. As a result, the program 111 returns control to the process control program 109.

In step 141, the process control program 109 sets the deviation flag to indicate that a deviation is currently occurring. It then waits in step 149 for the next real sampling time $t_r=t_r+\Delta t_r$ to return to steps 133 and 134 to determine whether the deviation is still occurring.

But, if it is determined in step 140 that the actual heating lethality $F^1$ over $[t_0, t_r]$ does satisfy the target heating lethality $F_{targh}$, then the temperature deviation program 111 proceeds to step 142. In step 142, this program simulates the remaining portion of the batch sterilization process that is predicted to be administered after the current real sampling time $t_r$, assuming that the processing phase ends at this time. This portion is, of course, the cooling phase. The simulation is done in order to compute a total lethality $F^1$ predicted to be delivered to the batch over a predicted total time interval $[t_0, t_r+\Delta t_c^1]$.

In performing this simulation, the simulation model mentioned earlier is used to iteratively simulate the remaining portion of the product cold spot time-temperature profile $T_{CS}(t)^1$ predicted to occur over the predicted total time interval $[t_0, t_r+\Delta t_c^1]$. This simulation is based on the input parameters $j_c$, $f_c$, $T_{cRT}(t)$ and the actual product cold spot temperature $T_{CS}(t_r)^1$ at the current real sampling time $t_r$. This temperature $T_{CS}(t_r)^1$ is obtained from the actual portion of the profile $T_{CS}(t)^1$ that was simulated in step 139.

Since it is assumed that the processing phase has ended at the time try the cooling time-temperature gradient $T_{cRT}(t)$ is shifted over to begin at a selected cooling retort temperature $T_{cRT}^1$ which is offset from the actual retort temperature $T_{aRT}(t_r)$ at the time $t_r$. The time duration $\Delta t_c^1$ therefore covers the portion of the gradient $T_{cRT}(t)$ that is between the temperature $T_{cRT}^1$ and the ending retort temperature $T_{eRT}$. This allows the actual retort time-temperature profile $T_{aRT}(t)$ to be brought down along and at least equal to this portion of the gradient $T_{cRT}(t)$.

The program 110 iteratively and incrementally computes the predicted total lethality $F^1$ over $[t_0, t_r+\Delta t_c^1]$ based on the product cold spot time-temperature profile $T_{CS}(t)^1$, the actually delivered heating lethality $F^1$ over $[t_0, t_r]$, and the input parameters z and $T_{REF}$. This is done using the lethality equation described earlier, where $t_0=t_m$, $t_r+\Delta t_c=t_k$, $T_{CS}(t)^1=T_{CS}(t)$, and $F^1=F$. The precise manner in which step 142 is performed is discussed in greater detail in section 2.d.

In step 143, the temperature deviation program 111 determines whether the processing phase is to end at the current real sampling time $t_r$ while the temperature deviation is still occurring. This is done by determining if the predicted total lethality $F^1$ over $[t_0, t_r+\Delta t_c^1]$ satisfies the target heating lethality $F_{targtot}$. If it is determined that the processing phase has ended, then the program proceeds to step 147 which will be discussed later.

In the case where it is determined in step 143 that the processing phase is to continue, the temperature deviation program 111 returns control to the process control program 109. The process control program then sets the deviation flag in step 141 to indicate that a deviation is currently occurring. In step 149, the process control program waits for the next real sampling time $t_r=t_r+\Delta t_r$. In this way, steps 133 to 143 are repeated for each real sampling time $t_r$ beginning with the deviation begin time $t_d^1$ until it is determined in step 134 that the temperature deviation has cleared or it is determined in step 143 that the processing phase has ended.

In the case where it is determined in step 134 that the temperature deviation has cleared, the process control program 109 proceeds to step 144 after determining in step 135 that the deviation flag is set. In step 144, the program records the current real sampling time $t_r$ as the deviation end time $t_e^1$ of the deviation. The process control program 109 then again invokes the temperature deviation program 111.

In step 145, the temperature deviation program 111 simulates the remaining portion of the batch sterilization process that is predicted to be administered beginning at the deviation end time $t_e^1$. This remaining portion includes the remaining portion of the processing phase beginning with the time $t_e^1$ and the cooling phase. This is done in order to define a re-scheduled remaining time-temperature profile $T_{sRT}(t)^1$ over a re-scheduled remaining time interval $[t_e^1, t_c^1]$.

The re-scheduled remaining time-temperature profile $T_{RT}(t)^1$ has a remaining processing portion over a re-scheduled remaining processing time interval $[t_e^1, t_p^1]$. This portion comprises the scheduled processing retort temperature $T_{pRT}^0$ as constant over the time interval $(t_e^1, t_p^1]$. Thus, the first temperature deviation is actually cleared between the actual retort time-temperature profile $T_{aRT}(t)$ and this portion of the profile $T_{sRT}(t)^1$ at the deviation end time $t_e^1$. The profile $T_{sRT}(t)^1$ also has a cooling portion over a re-scheduled cooling time interval $(t_p^1, t_c^1]$. This portion comprises the portion of the time-temperature gradient $T_{cRT}(t)$ between the temperature $T_{pRT}^0$ and the ending retort temperature $T_{eRT}$ over the time interval $(t_p^1, t_c^1]$.

The precise manner in which step 145 is performed is briefly discussed next and is discussed in greater detail in section 2.e. The simulation model mentioned earlier is used by the temperature deviation program 111 in step 145. The program 111 uses the model to iteratively and incrementally simulate the portion of the product cold spot time-temperature profile $T_{CS}(t)^1$ that is predicted to occur over the remaining portion of the batch sterilization process. This simulation is done based on the input parameters $j_h$, $f_h$, $X_{bh}$, $f_2$, $j_c$, $f_c$, $T_{pRT}^0$, and $T_{cRT}(t)$ and the product cold spot temperature $T_{CS}(t_{e-\Delta tr})^1$ at the previous real sampling time $t_e-\Delta t_r$. The product cold spot temperature $T_{CS}(t_e-\Delta t_r)^1$ is obtained from the actual re-scheduled product cold spot time-temperature profile $T_{CS}(t)^1$ simulated at the time $t_e^1-\Delta t_r$ in step 139.

In step 145, the program 110 also iteratively and incrementally computes a total lethality $F^1$ that is predicted to be delivered to the product cold spot of the batch 101 over the remaining portion of the batch sterilization process. In doing so, the program 110 computes a heating lethality $F^1$ that satisfies the target heating lethality $F_{targh}$ and is predicted to be delivered over a re-scheduled heating time interval $[t_0, t_p^1]$. This computation is made based on the portion of the re-scheduled product cold spot time-temperature profile $T_{CS}(t)^1$ that is predicted to occur over the re-scheduled remaining processing time interval $[t_e^1, t_p^1]$, the actually delivered heating lethality $F^1$ over $[t_0, t_e^1)$ from step 139, and the input parameters z and $T_{REF}$. Furthermore, the lethality equation described earlier is used to make this computation, where $t_m=t_0$, $t_k=t_p^1$, $T_{CS}(t)^1$, $=T_{CS}(t)^1$, and $F=F^1$. The predicted heating lethality $F^1$ over $[t_0, t_p^1]$ is therefore the sum of the actually delivered heating lethality $F^1$ over $[t_0, t_e^1)$ and a heating lethality $F^1$ predicted to be delivered over the time interval $[t_e^1, t_p^1]$. The remaining processing portion of the re-scheduled remaining time-temperature profile $T_{sRT}(t)^1$ on which the portion of the profile $T_{CS}(t)^1$ over the time interval $[t_e^1, t_p^1]$ is based is defined as a result.

Similarly, the temperature deviation program 111 also iteratively and incrementally computes a total lethality $F^1$ that satisfies the target total lethality $F_{targtot}$ and is predicted to be delivered over a re-scheduled total time interval $[t_0, t_c^1]$. The lethality equation is also used in this computation, but where $t_k=t_c^1$. Moreover, the predicted total lethality $F^1$ over $[t_0, t_c^1]$ is based on the portion of the product cold spot time-temperature profile $T_{CS}(t)^1$ predicted to be delivered over a re-scheduled cooling time interval $(t_p^1, t_c^1]$, the predicted heating lethality $F^1$ over $[t_0, t_p^1]$, and the input parameters z and $T_{REF}$. Thus, the predicted total lethality $F^1$ over $[t_0, t_c^1]$ is the sum of the predicted heating lethality $F^1$ over $[t_0, t_p^1]$ and a cooling lethality $F^1$ predicted to be delivered over the time interval $(t_p^1, t_c^1]$. The cooling portion of the re-scheduled remaining time-temperature profile $T_{sRT}(t)^1$ on which the portion of the profile $T_{CS(t)}^1$ over the time interval $(t_p^1, t_c^1]$ is based is also defined in this way.

In step 146, the process control program 109 clears the deviation flag since it has been determined in step 134 that the first temperature deviation has been cleared. The program then returns to step 130. Since the deviation counter n has been incremented to one, the re-scheduled processing end time $t_p^1$ is now used in step 132. Therefore, steps 130 to 135 will be repeated until it is determined in step 132 that the current real sampling time $t_r$ is the end time $t_p^1$ or until a second temperature deviation is detected in step 134.

From the foregoing, it should be clear that only the initial portion of the batch sterilization process over the initial time interval $[t_0, t_d^1)$ before the temperature deviation begins will be administered according to the scheduled total time-temperature profile $T_{sRT}(t)^0$. Then, when the deviation clears, the remaining portion of the process over the remaining time interval $[t_e^1, t_c^1)$ will be administered according to the re-scheduled remaining time-temperature profile $T_{sRT}(t)^1$ if a second temperature deviation does not occur.

The process control program 109 then causes the cooling phase in step 148 to be administered by the control circuitry 117. The control circuitry does so in accordance with the re-scheduled remaining time-temperature profile $T_{sRT}(t)^1$ by appropriately controlling the batch sterilizer 102. Thus, the actual retort time-temperature profile $T_{aRT}(t)$ is brought down along the cooling portion of the profile $T_{sRT}(t)^1$ over the re-scheduled cooling time interval $(t_p^1, t_c^1]$. In doing so, the control circuitry controls the batch sterilizer and monitors the sensed actual retort temperature $T_{aRT}(t_r)$ at each real sampling time $t_r$ to make sure that it stays at least equal to the corresponding re-scheduled cooling retort temperature $T_{sRT}(t_r)^1$ for that time. The temperature $T_{sRT}(t_r)^1$ is obtained from the profile $T_{sRT}(t)^1$.

Figure 8:
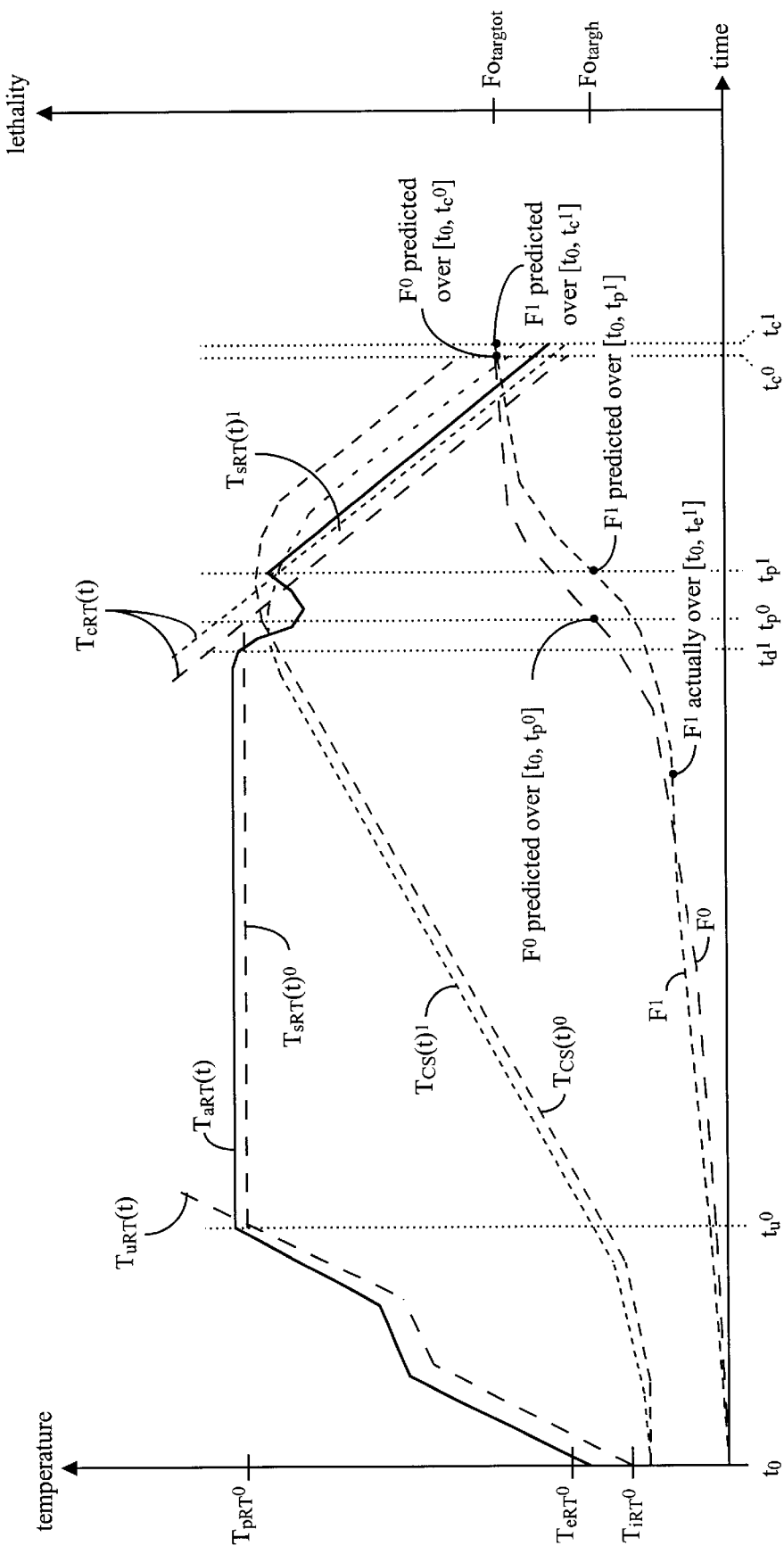

Referring now to FIGS. 6 and 8, as mentioned earlier, it is possible that the processing phase will actually end at a current real sampling time $t_r$ while the temperature deviation is still occurring. This is determined in step 143 when the total lethality $F^1$ predicted to be delivered over the predicted total time interval $[t_0, t_r+\Delta t_c^1]$ satisfies the target heating lethality $F_{targtot}$. In this case, the temperature deviation program 111 defines in step 147 the re-scheduled processing end time $t_p^1$ as the time $t_r$ and the re-scheduled cooling end time $t_c^1$ as the time $t_r+\Delta t_c^1$. Moreover, the re-scheduled remaining time-temperature profile $T_{sRT}(t)^1$ on which the product cold spot temperature profile $T_{CS}(t)^1$ is based is also defined in step 147. As alluded to earlier, this comprises the portion of the cooling time-temperature gradient $T_{cRT}(t)$ between the selected cooling and ending retort temperatures $T_{cRT}^1$ and $T_{eRT}$ over the re-scheduled remaining time interval $(t_p^1, t_c^1)$.

The process control program 109 then causes the cooling phase in step 148 to be administered by the control circuitry 117. This is done in accordance with the re-scheduled remaining time-temperature profile $T_{sRT}(t)^1$ over the re-scheduled remaining time interval $(t_p^1, t_c^1)$ in the manner described earlier.

It is important to note here that the controller 104 has the unique feature of being able to handle multiple temperature deviations during the processing phase. Thus, as mentioned earlier, it is possible that a second temperature deviation is detected in step 134 after the first temperature deviation. In this case, if it is eventually determined in step 134 that this deviation has cleared, steps 133 to 149 are repeated to define another re-scheduled remaining time-temperature profile $T_{pRT}(t)^2$ over another re-scheduled remaining time interval $[t_e^2, t_p^2]$. But, it may be determined in step 143 that the processing phase has in fact ended while the deviation is still occurring. In this case, the profile $T_{sRT(t)}^2$ over the time interval $(t_p^2, t_c^2)$ is defined in step 147 and the cooling phase is administered in step 148 accordingly.

2.b. Detailed Process Flow for Step 127 of FIG. 6

Figure 9A:
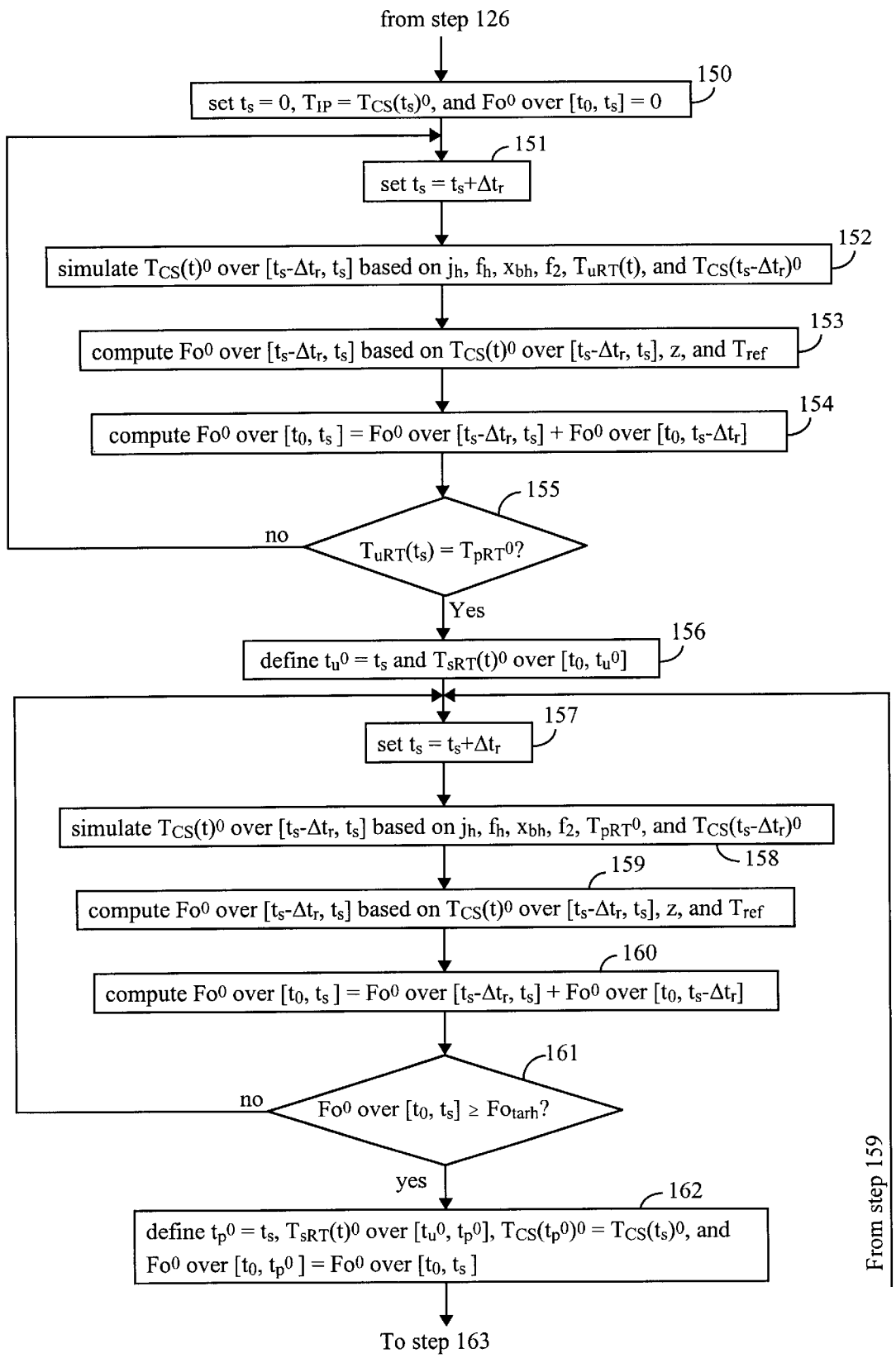
FIGS. 9 to 12 are detailed process flow diagrams for various steps of the overall process flow diagram of FIG. 6.
Figure 9B:
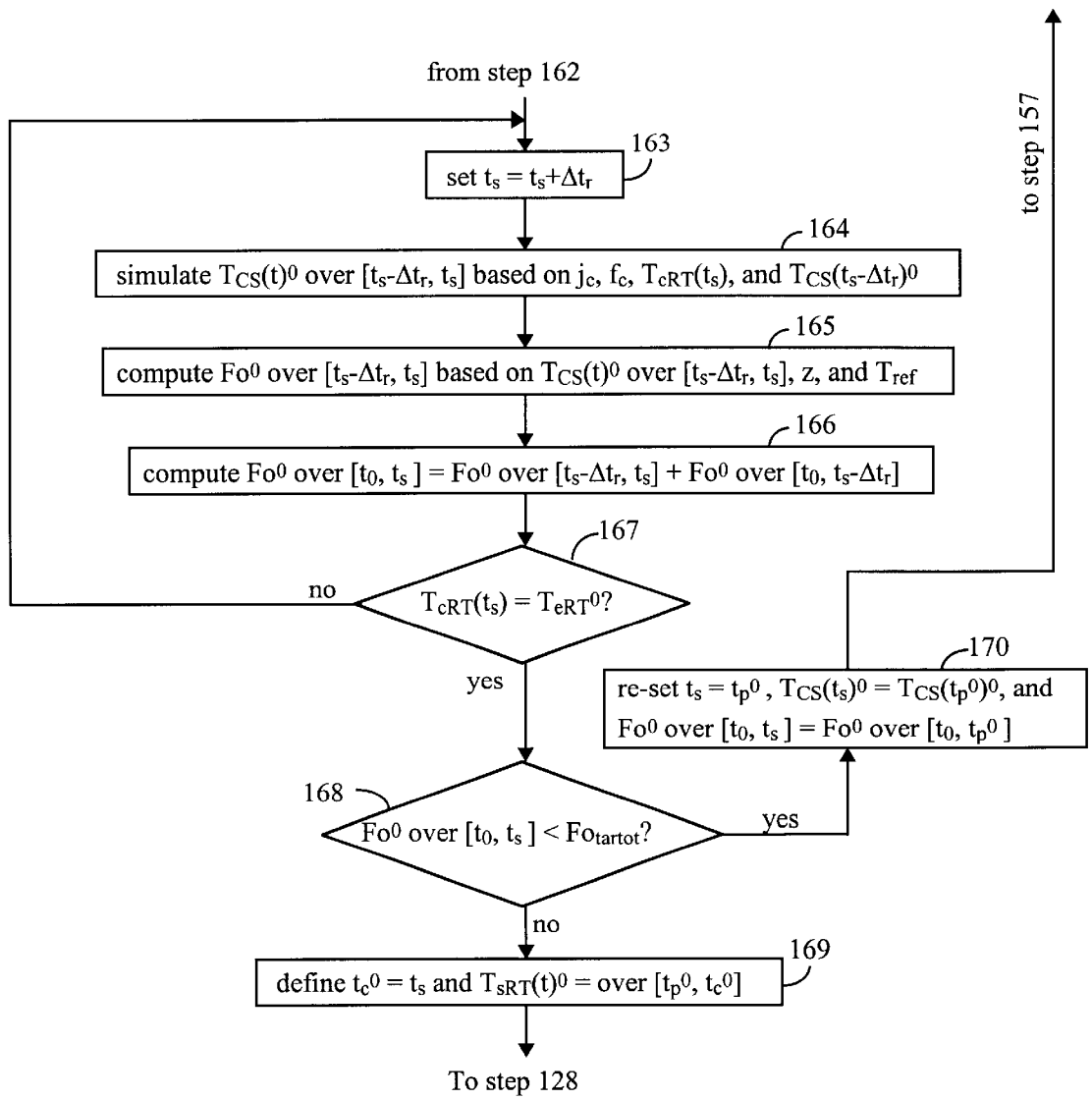
Figure 9:
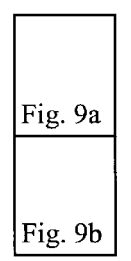

FIG. 9 shows the detailed process flow that the process scheduling program 110 uses in step 127 of FIG. 6 to define the scheduled total time-temperature profile $T_{sRT}(t)^0$. The program 109 first iteratively performs a simulation of the come-up phase in sub-steps 150 to 156 of step 127.

In step 150, the current simulation sampling time $t_s$ is initially set to the come-up begin time $t_0$. The product cold spot temperature $T_{CS}(t_s)^0$ at the current simulation sampling time $t_s$ is therefore initially set in step 150 to the initial product temperature $T_{IP}$. And, the heating lethality $F^0$ predicted to be delivered to the product cold spot over the current simulation time interval $[t_0, t_s]$ is initially set in step 150 to zero.

Steps 151 to 155 are then performed by the process scheduling program 110 in each iteration of the come-up phase simulation. In step 151 of each iteration, the current simulation sampling time $t_s$ is incremented by the amount of the sampling period $\Delta t_r$. This results in a new current simulation sampling time $t_s$.

The portion of the product cold spot time-temperature profile $T_{CS}(t)^0$ predicted to occur over the current simulation time increment $[t_s-\Delta t_r, t_s]$ is then simulated in step 152 of each iteration by the process scheduling program 110. This is done using the simulation model discussed earlier. Moreover, this simulation is based on the heating factors $j_h$, $f_h$, $X_{bh}$, and $f_2$, the product cold spot temperature $T_{CS}(t_{s-\Delta tr})^0$ at the previous simulation sampling time $t_s-\Delta t_r$, and the corresponding scheduled come-up retort temperature $T_{uRT}(t_s)$ at the current simulation time $t_s$. In the first iteration, the product cold spot temperature $T_{CS}(t_s-\Delta t_r)^0$ will be the initial product temperature $T_{IP}$ from step 150. However, in each subsequent iteration, this temperature is obtained from the product cold spot time-temperature profile $T_{CS}(t)^0$ over the previous simulation time increment $[t_s-2\Delta t_r, t_s-\Delta t_r]$ simulated in step 152 of the previous iteration. The temperature $T_{uRT}(t_s)$ is obtained from the pre-defined come-up time-temperature gradient $T_{uRT}(t)$.

Then, in step 153 of each iteration, the process scheduling program 110 computes the heating lethality $F^0$ that is predicted to be delivered over the current simulation time increment $[t_s-\Delta t_r, t_s]$. This is done based on the portion of the product cold spot time-temperature profile $T_{CS}(t)^0$ over the time increment $[t_s-\Delta t_r, t_s]$ and the input parameters z and $T_{REF}$. This is also done in accordance with the lethality equation described earlier, where $t_s-\Delta t_r=t_m$, $t_s=t_k$, $T_{CS}(t)^0 = T_{CS}(t)$, and $F^0=F$.

In step 154 of each iteration, the process scheduling program 110 computes the heating lethality $F^0$ predicted to be delivered over the current simulation time interval $[t_0, t_s]$. This is done by adding the predicted heating lethality $F^0$ over $[t_s-\Delta t_r, t_s]$ from step 153 to the heating lethality $F^0$ predicted over the previous simulation time interval $[t_0, t_s-\Delta t_r]$. In the first iteration, the lethality $F^0$ over $[t_0, t_s-\Delta t_r]$ is zero from step 150. In each subsequent iteration, this lethality is computed in step 154 of the previous iteration.

Then, in step 155 of each iteration, the process scheduling program 110 determines whether the corresponding scheduled come-up retort temperature $T_{uRT}(t_s)$ at the current simulation time $t_s$ is the scheduled processing retort temperature $T_{pRT}^0$. This temperature $T_{uRT(ts)}$ is obtained from the come-up time-temperature gradient $T_{uRT}(t)$. If the temperatures $T_{uRT}(t_s)$ and $T_{pRT}^0$ are not the same, then the process scheduling program 110 returns to step 151 for the next iteration. In this way, steps 151 to 155 are repeated in each subsequent iteration until it is determined that the temperatures $T_{uRT}(t_s)$ and $T_{pRT}^0$ are the same. When this occurs, the scheduled come-up end time $t_u^0$ is defined as the current simulation sampling time $t_s$ in step 156 by the program 110. The program 110 also defines the come-up portion of the scheduled total time-temperature profile $T_{sRT}(t)^0$ as the portion of the come-up time-temperature gradient $T_{uRT}(t)$ between the initial and scheduled processing retort temperatures $T_{iRT}$ and $T_{pRT}^0$ over the scheduled come-up time interval $[t_0, t_{u,0}]$.

Alternatively, the scheduled come-up end time $t_u^0$ may be directly defined by the operator from the come-up time-temperature gradient $T_{uRT}(t)$ using the scheduled processing retort temperature $T_{pRT}^0$. The time $t_u^0$ would be entered as one of the input parameters. Then, the determination in step 155 would be whether this time $t_u^0$ and the current simulation sampling time $t_s$ are the same.

The process scheduling program 110 then iteratively performs a simulation of the processing phase in sub-steps 157 to 162 of step 127. Steps 157 to 161 are performed in each iteration of the processing phase simulation. Moreover, steps 157 to 160 are respectively the same as steps 151 to 154, except for the differences described next.

In step 158 of each iteration, the portion of the product cold spot time-temperature profile $T_{CS}(t)^0$ predicted to occur over the current simulation time increment $[t_s-\Delta t_r, t_s]$ is simulated based on the scheduled retort processing temperature $T_{pRT}^0$. The temperature $T_{pRT}^0$ is used in the simulation instead of a scheduled come-up retort temperature $T_{uRT}(t_s)$. It should be noted that, in step 158 of the first iteration, the scheduled product cold spot temperature $T_{CS}(t_s-\Delta t_r)^0$ is obtained from the profile $T_{CS}(t)^0$ predicted over the previous simulation time increment $[t_s-2\Delta t_r, t_s-\Delta t_r]$ in step 152 of the last iteration of the come-up phase simulation. Similarly, in step 160 of the first iteration, the heating lethality $F^0$ predicted over the previous simulation time interval $[t_0, t_s-\Delta t_r]$ is computed in step 154 of the last iteration of the come-up phase simulation.

Then, in step 161 of each iteration, the process scheduling program 110 determines whether the heating lethality $F^0$ predicted over the current simulation time interval $[t_0, t_s]$ is at least equal to the target heating lethality $F_{targh}$. If it is not, then the process scheduling program 110 returns to step 157 for the next iteration. As a result, the steps 157 to 161 are repeated for each subsequent iteration until it is determined in step 161 that the lethality $F^O$ over the current simulation time interval $[t_0, t_s]$ is in fact at least equal to the lethality $F_{targh}$. When this occurs, the program 110 defines in step 162 the scheduled processing end time $t_p^0$ as the current simulation sampling time $t_s$. As a result, the program 110 also defines in step 162 the processing portion of the scheduled total time-temperature profile $T_{sRT}(t)^0$ as the constant scheduled processing retort temperature $T_{pRT}^0$ over a scheduled processing time interval $(t_u^2, t_p^0]$. The program 110 further defines in step 162 the heating lethality $F^O$ predicted over the scheduled heating time interval $[t_0, t_p^0]$ as the lethality $F^O$ predicted over the current simulation time interval $[t_0, t_s]$ in step 160 of the last iteration. Finally, the program 110 defines in step 162 the scheduled product cold spot temperature $T_{CS}(t_p^0)^0$ at the time $t_p^0$ as the product cold spot temperature $T_{CS}(t_s)^0$ obtained from the product cold spot temperature profile $T_{CS}(t)^0$ simulated over the time increment $[t_s-\Delta t_r, t_s]$ in step 158 of the last iteration.

The process scheduling program 110 then iteratively performs a simulation of the cooling phase in sub-steps 163 to 170 of step 127. Steps 163 to 167 are performed in each iteration of the cooling phase simulation. Furthermore, steps 163 to 166 are respectively the same as steps 151 to 154 described earlier, except for some differences that are discussed next.

In step 164 of each iteration, the process scheduling program 110 simulates the portion of the scheduled product cold spot time-temperature profile $T_{CS}(t)^0$ predicted over the current simulation time increment $[t_s-\Delta t_r, t_s]$. This is simulation is based on the cooling factors $j_c$ and $f_c$ and the scheduled cooling retort temperature $T_{cRT}(t_s)$ at the current simulation sampling time $t_s$. The temperature $T_{cRT}(t_s)$ is obtained from the scheduled cooling time-temperature gradient $T_{cRT}(t)$. Moreover, for the first iteration, the product cold spot temperature $T_{CS}(t_s-\Delta t_r)^0$ is obtained from the profile $T_{CS}(t)^0$ predicted over the previous simulation time increment $[t_s-2\Delta t_r, t_s-\Delta t_r]$ in step 158 of the last iteration of the processing phase simulation. For each subsequent iteration, the product cold spot temperature $T_{CS}(t_s-\Delta t_r)^0$ is obtained from the profile $T_{CS}(t)^0$ predicted over the previous simulation time increment $[t_s-2\Delta t_r, t_s-\Delta t_r]$ in step 164 of the previous iteration.

In step 165 of each iteration, a cooling lethality $F^O$ that is predicted to be delivered to the batch 101 over the current simulation time increment $[t_s-\Delta t_r, t_s]$ is computed by the process scheduling program 110. Then, in step 166 of each iteration, the total lethality $F^O$ predicted to be delivered over the current simulation time interval $[t_0, t_s]$ is computed. This is done by adding the lethality $F^O$ predicted over the current simulation time increment $[t_s-\Delta t_r, t_s]$ in step 165 of the iteration to the lethality $F^O$ predicted over the previous simulation time interval $[t_0, t_s-\Delta t_r]$. For the first iteration, the lethality $F^O$ over $[t_0, t_s-\Delta t_r]$ is computed in step 160 of the last iteration of the processing phase simulation. But, for each subsequent iteration, this lethality is computed in step 166 for the previous iteration.

Then, in step 167 of each iteration, the process scheduling program 110 determines whether the corresponding scheduled cooling retort temperature $T_{cRT}(t_s)$ at the current simulation time $t_s$ is the ending retort temperature $T_{eRT}$ of the cooling retort time-temperature gradient $T_{cRT}(t)$. If it is not, then the process scheduling program 110 returns to step 163 for the next iteration. Thus, steps 163 to 167 are repeated in each subsequent iteration until it is determined in step 167 that the temperatures $T_{ucRT}(t_s)$ and $T_{eRT}$ are the same.

When this finally occurs, the program 110 determines in step 168 whether the total lethality $F^O$ predicted over the current simulation time interval $[t_0, t_s]$ is at least equal to the target total lethality $F_{targtot}$. If it is, then the program 110 defines the scheduled cooling end time $t_c^0$ as the time $t_s$ in step 169. The program 110 also defines in step 169 the cooling portion of the scheduled total time-temperature profile $T_{sRT}(t)^0$ as the portion of the gradient $T_{cRT}(t)$ between the scheduled processing and ending retort temperatures $T_{pRT}^0$ and $T_{eRT}$ over the scheduled cooling time interval $[t_p^0, t_c^0]$.

But, it may be determined in step 168 that the total lethality $F^O$ predicted over the current simulation time interval $[t_0, t_s]$ is at least equal to the target total lethality $F_{targtot}$. In this case, program 110 re-sets the current simulation sampling time $t_s$ in step 170 to the scheduled processing end time $t_p^0$ defined in step 162. In view of this, the program 110 also re-sets the lethality $F^O$ predicted over the simulation time interval $[t_0, t_s]$ to the heating lethality $F^O$ over the scheduled heating time interval $[t_0, t_p^0]$ defined in step 162. Furthermore, the program 110 re-sets the product cold spot temperature $T_{CS}(t_s)^0$ to the product cold spot temperature $T_{CS}(t_p^0)^0$ defined step 162.

The process scheduling program 110 then returns to step 157. As a result, steps 157 to 161 will be performed in another iteration in the processing phase and the scheduled processing end time $t_p^0$ will be redefined in step 162. The re-defined scheduled processing end time $t_p^0$ will be the previously defined one incremented by the amount of the sampling period $\Delta t_r$. Then, the entire cooling phase will be iteratively simulated again in steps 163 to 167 and it will be determined in step 168 whether the lethality F over the current simulation time interval $[t_0, t_s]$ is at least equal to the target total lethality $F_{targtot}$. If this is not the case, then the program 110 returns again to step 157 and steps 157 to 168 are repeated until it is finally determined in step 168 that the lethality F predicted over the time interval $[t_0, t_s]$ does satisfy the target total lethality $F_{targtot}$. When this occurs, the program 110 defines the cooling portion of the scheduled total time-temperature profile $T_{sRT}(t)^0$ predicted over the scheduled cooling time interval $[t_p^0, t_c^0]$ in step 169 in the manner described earlier.

The scheduled total time-temperature profile $T_{sRT}(t)^0$ is then used to administer the batch sterilization process. This is done in the manner described earlier in section 2.a. discussing the overall process flow of the controller 104.

2.c. Detailed Process Flow for Step 139 of FIG. 6

Figure 10:
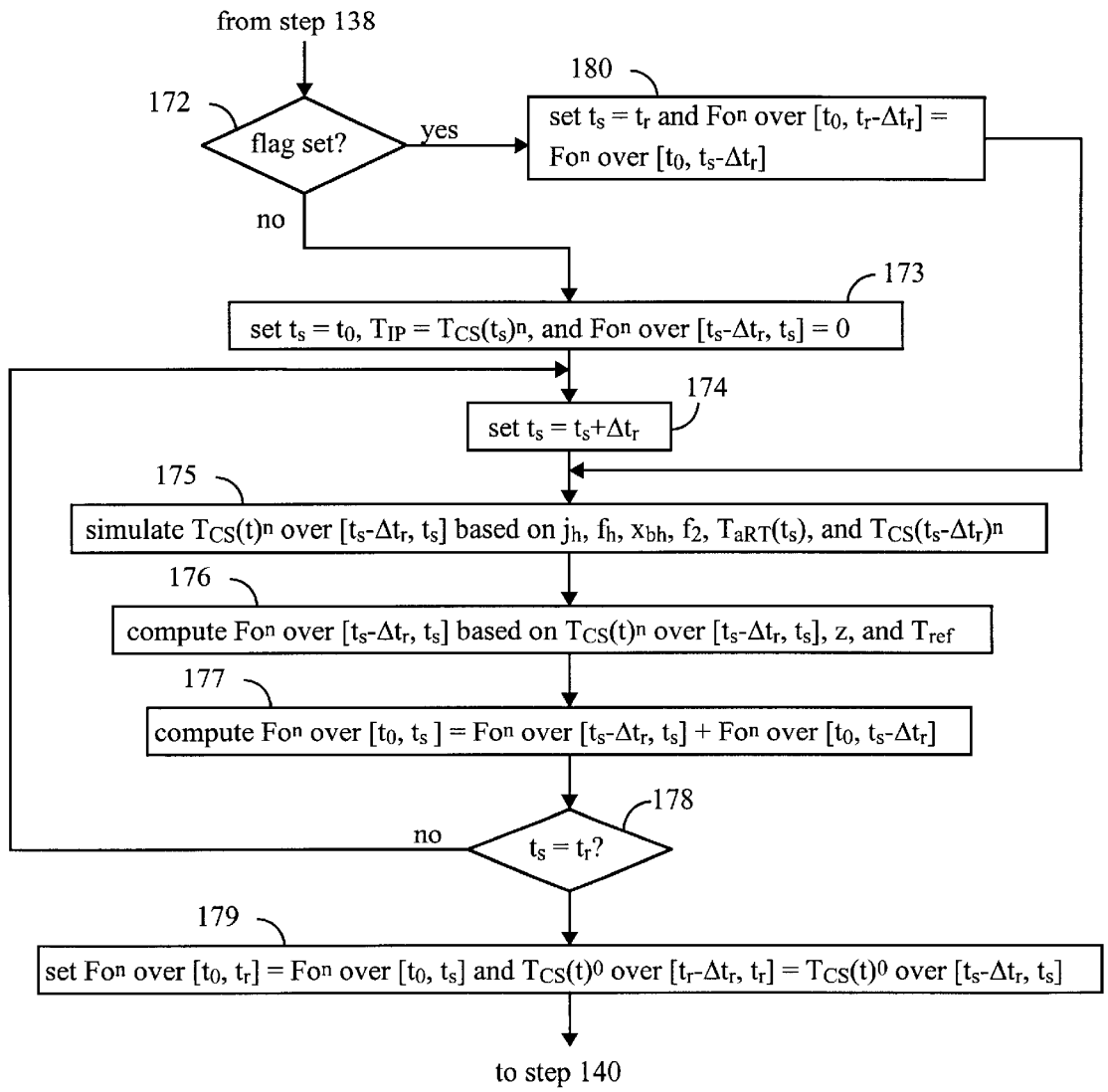

FIG. 10 shows the detailed process flow that the temperature deviation program 111 uses in step 139 of FIG. 6 at the current real sampling time $t_r$ during the nth temperature deviation. As indicated earlier, this program computes in step 139 the re-scheduled lethality $F^1$ actually delivered over the expired time interval $[t_0, t_r]$.

In sub-step 172 of step 139, the program 111 determines whether the deviation flag is set. If it is not, then this means that the current real sampling time $t_r$ is the deviation begin time $t_d^1$ of the first temperature deviation since the deviation counter is now set to one. In this case, the program 111 proceeds to step 173 and iteratively performs in sub-steps 173 to 179 of step 139 a simulation of the come-up phase and the portion of the processing phase actually administered up to the time $t_r$. Steps 174 to 178 are performed in each iteration of the simulation. Furthermore, steps 173 to 178 are respectively the same as steps 150 to 154 of FIG. 9 and discussed in section 2.b., except for the important differences discussed next.

In step 173 and steps 174 and 175 of each iteration, the portion of the product cold spot time-temperature profile $T_{CS}(t)^1$ that actually occurred over the current simulation time increment $[t_s-\Delta t_r, t_s]$ and an actual product cold spot temperature $T_{CS}(t_s-\Delta t_r)^1$ at the previous simulation sampling time $t_s-\Delta t_r$ are simulated and used. This portion of the profile $T_{CS}(t)^1$ over the time increment $[t_s-\Delta t_r, t_s]$ is simulated based on the actual retort temperature $T_{aRT}(t_s)$ recorded for the current simulation sampling time $t_s$. The temperature $T_{sRT}(t_s)$ is obtained from the compiled actual retort time-temperature profile $T_{aRT}(t)$. Furthermore, actually delivered lethalities $F^0$ over $[t_s-\Delta t_r, t_s]$, $F^0$ over $[t_0, t_s]$, and $F^0$ over $[t_0, t_s-\Delta t_r]$ are computed and used in steps 176 to 178 of each iteration.

In step 178 of each iteration, the temperature deviation program 111 determines whether the current simulation sampling time $t_s$ has reached the current real sampling time $t_r$. If it has not, then the program returns to step 174 for the next iteration. In this way, steps 174 to 178 are repeated in each subsequent iteration until it is determined that the times $t_s$ and $t_r$ are the same.

When this finally occurs, the temperature deviation program 111 defines in step 179 the heating lethality $F^1$ actually delivered over the expired real time interval $[t_0, t_r]$ as the lethality $F^1$ computed over the current simulation time interval $[t_0, t_s]$ in step 177 of the last iteration. Similarly, the program defines the actual product cold spot temperature $T_{CS}(t_r)^1$ at the time $t_r$ as the product cold spot temperature $T_{CS}(t_s)^1$. The temperature $T_{CS}(t_s)^1$ is obtained from the portion of the product cold spot time-temperature profile $T_{CS}(t)^1$ simulated over the time increment $[t_{s-\Delta tr}, t_s]$ in step 175.

But, it may be determined in step 172 that the deviation flag is set. In this case, the current real sampling time $t_r$ is not the deviation begin time $t_d$ since the temperature deviation has already begun. The temperature deviation program 111 then proceeds to step 180 where it sets the current simulation sampling time $t_s$ to the time $t_r$. The program also sets in step 180 the lethality $F^1$ over the previous simulation time interval $[t_0, t_s-\Delta t_r]$ to the heating lethality $F^1$ actually delivered over the expired real time interval $[t_0, t_r-\Delta t_r]$ defined at the previous real sampling time $t_r-\Delta t_r$ in step 179. Then, steps 175 to 179 are performed in the manner just discussed to define the actually delivered heating lethality $F^1$ over $[t_0, t_r]$ and the actual product cold spot temperature $T_{CS}(t_r)^1$ at the time $t_r$.

2.d. Detailed Process Flow for Step 142 of FIG. 6

Figure 11:
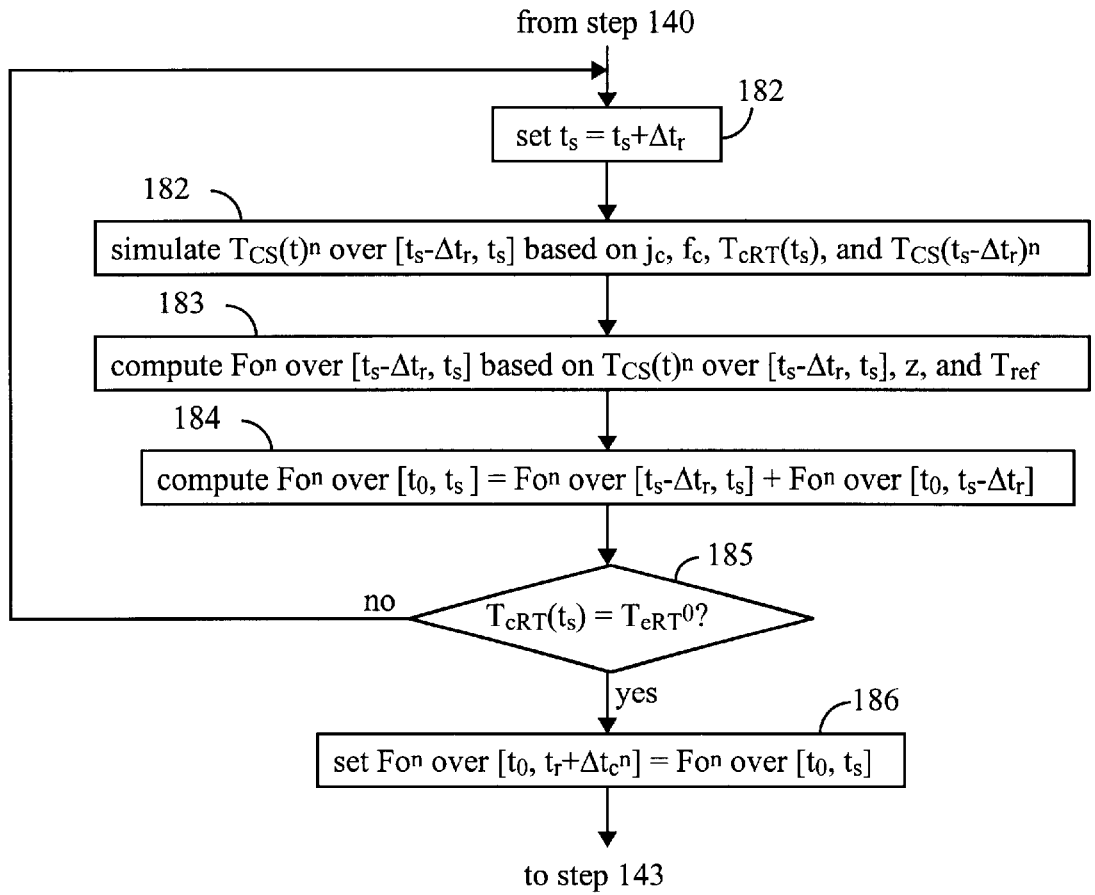

FIG. 11 shows the detailed process flow that the temperature deviation program 111 uses in step 142 of FIG. 6 at the current real sampling time $t_r$ during the first temperature deviation. As indicated earlier, the total lethality $F^1$ predicted to be delivered over the re-scheduled total time interval $[t_0, t_r+\Delta t_c^1]$ is computed by the program 111 in step 142.

In doing so, the program 111 iteratively performs in sub-steps 182 to 186 of step 142 a simulation of the cooling phase beginning at the time $t_r$ assuming that the processing phase has ended. Steps 182 to 185 are performed in each iteration of the cooling phase simulation. And, steps 182 to 186 are respectively the same as steps 163 to 167 of FIG. 9 and discussed in section 2.b., except for the notable differences discussed next.

In steps 182 and 183 of each iteration, the portion of the product cold spot time-temperature profile $T_{CS}(t)^1$ that is predicted to occur over the current simulation time increment $[t_s-\Delta t_r, t_s]$ and a predicted product cold spot temperature $T_{CS}(t_s-\Delta t_r)^1$ at the previous simulation sampling time $t_s-\Delta t_r$ are simulated and used. The profile $T_{CS}(t)^1$ over the time increment $[t_s-\Delta t_r, t_s]$ is simulated based on the re-scheduled cooling retort temperature $T_{cRT}(t_s)$ at the current simulation sampling time $t_s$. The temperature $T_{cRT}(t_s)$ is obtained from the scheduled cooling time-temperature gradient $T_{cRT}(t)$. Since it is assumed that the processing phase has ended at the time $t_r$, the gradient $T_{cRT}(t)$ is shifted so as to begin at the selected cooling retort temperature $T_{cRT}^1$ which is offset from the actual retort temperature $T_{aRT}T(t_r)$ at the time $t_r$.

Furthermore, a predicted cooling lethality $F^0$ over the current simulation time increment $[t_s-\Delta t_r, t_s]$ is computed and used in steps 183 and 184 of each iteration. In addition, predicted lethalities $F^0$ over $[t_s-\Delta t_r, t_s]$, $F^0$ over $[t_0, t_s]$, and $F^0$ over $[t_0, t_s-\Delta t_r]$ are computed and used in steps 182 to 184 of each iteration.

In step 185 of the last iteration, the temperature deviation program 111 determines that the corresponding scheduled cooling retort temperature $T_{cRT}(t_s)$ at the current simulation time $t_s$ is the ending retort temperature $T_{eRT}$. The program then sets in step 186 the total lethality $F^1$ predicted to be delivered over the re-scheduled total time interval $[t_0, t_r+\Delta t_c^1]$ to the lethality $F^1$ computed over the current simulation time interval $[t_0, t_s]$ in step 184 of the last iteration. As mentioned earlier, the time duration $\Delta t_c^1$ covers the portion of the cooling time-temperature gradient $T_{cRT}(t)$ that is between the selected cooling and ending retort temperatures $T_{cRT}^1$ and $T_{eRT}$.

2.e. Detailed Process Flow for Step 145 of FIG. 6

Figure 12:
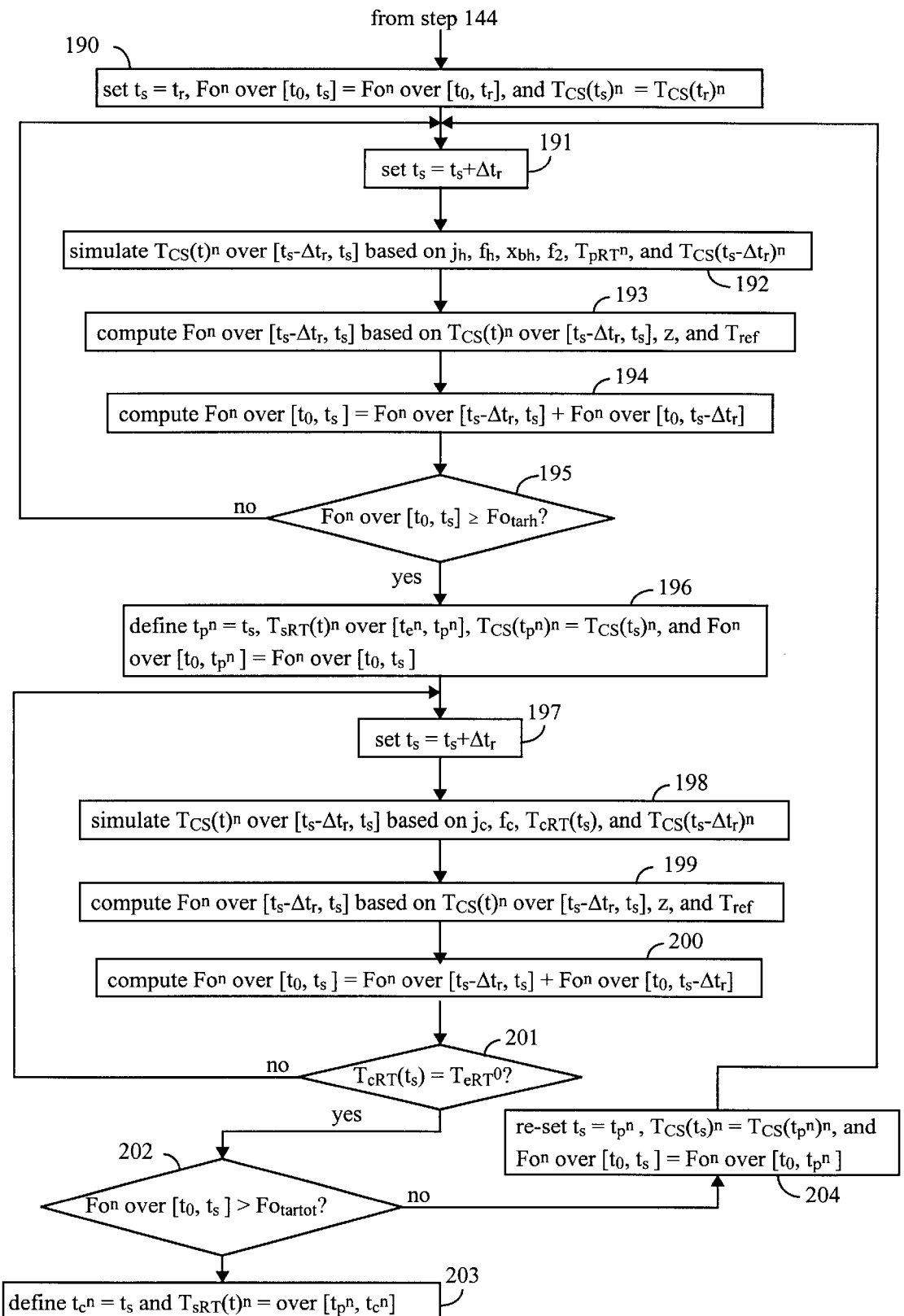

FIG. 12 shows the detailed process flow that the temperature deviation program 111 uses in step 145 of FIG. 6 when the current real sampling time $t_r$ is the deviation end time $t_e^1$ for the first temperature deviation. As indicated earlier, this is done to define the re-scheduled remaining time-temperature profile $T_{sRT}(t)^1$.

The program 109 first iteratively performs a simulation of the remaining portion of the processing phase in sub-steps 190 to 196 of step 145 when the first temperature deviation clears at the deviation end time $t_e^1$. In step 190, the temperature deviation program 111 sets the current simulation sampling time $t_s$ to the current real sampling time $t_r$. The program also sets in step 190 the lethality $F^1$ over the current simulation time interval $[t_0, t_s]$ to the heating lethality $F^1$ actually delivered over the expired real time interval $[t_0, t_r]$. The heating lethality $F^1$ over $[t_0, t_r]$ is defined in step 179 of FIG. 10 and discussed in section 2.c. Similarly, the program also sets in step 190 the product cold spot temperature $T_{CS}(t_s)^1$ at the time $t_s$ to the actual product cold spot temperature $T_{CS}(t_r)^1$ at the time $t_r$. The product cold spot temperature $T_{CS}(t_r)^1$ is defined in step 179 as well.

Steps 191 to 195 are performed in each iteration of the simulation of the remaining portion of the processing phase. Moreover, steps 191 to 196 are respectively the same as steps 157 to 162 of FIG. 9 and discussed in section 2.b., except for the differences noted next.

In steps 192 and 193 of each iteration, the portion of the product cold spot time-temperature profile $T_{CS}(t)^1$ predicted to occur over the current simulation time increment $[t_s-\Delta t_r, t_s]$ and a predicted product cold spot temperature $T_{CS}(t_s-\Delta t_r)^1$ at the previous simulation sampling time $t_s-\Delta t_r$ are simulated and used. Furthermore, predicted lethalities $F^0$ over $[t_s-\Delta t_r, t_s]$, $F^0$ over $[t_0, t_s]$, and $F^0$ over $[t_0, t_s-\Delta t_r]$ are computed and used in steps 193 to 195 of each iteration.

In step 195 of the last iteration, the temperature deviation program 111 determines that the lethality $F^0$ predicted over the current simulation time interval $[t_0, t_s]$ satisfies the target heating lethality $F_{targh}$. When this occurs, the program 111 defines in step 196 the re-scheduled processing end time $t_p^1$, the remaining processing portion of the re-scheduled remaining time-temperature profile $T_{sRT}(t)^1$ over the re-scheduled remaining processing time interval $(t_e^1, t_p^1)$, the heating lethality $F^0$ predicted to be delivered over the re-scheduled heating time interval $[t_0, t_p^1]$, and the product cold spot temperature $T_{CS}(t_p^1)^1$ predicted at the time $t_p^1$. The profile $T_{sRT}(t)^1$ comprises the constant scheduled processing retort temperature $T_{pRT}^0$ over the time interval $(t_e^1, t_p^1)$.

The temperature deviation program 111 then iteratively performs in sub-steps 197 to 204 of step 145 a simulation of the cooling phase. Steps 197 to 201 are performed in each iteration of the cooling phase simulation. And, steps 197 to 204 are respectively the same as steps 163 to 170 of FIG. 9 and discussed in section 2.b., except for some differences discussed next.

In steps 198 and 199 of each iteration, the portion of the product cold spot time-temperature profile $T_{CS}(t)^1$ predicted to occur over the current simulation time increment $[t_s-\Delta t_r, t_s]$ and a predicted product cold spot temperature $T_{CS}(t_s-\Delta t_r)^1$ at the previous simulation sampling time $t_s-\Delta t_r$ are simulated and used. Furthermore, a cooling lethality $F^0$ predicted to be delivered over the current simulation time increment $[t_s-\Delta t_r, t_s]$ is computed and used in steps 199 and 200 of each iteration. Furthermore, predicted lethalities $F^0$ over $[t_s-\Delta t_r, t_s]$, $F^0$ over $[t_0, t_s]$, and $F^0$ over $[t_0, t_s-\Delta t_r]$ are computed and used in steps 198 to 200 of each iteration.

After step 201 of the last iteration, the temperature deviation program 111 will proceed to step 203 if it determines in step 202 that the total lethality $F^0$ predicted over the current simulation time interval $[t_0, t_s]$ does satisfy the target total lethality $F_{targtot}$. Then, in step 203, the program defines the cooling portion of the re-scheduled remaining time-temperature profile $T_{sRT}(t)^1$ over the re-scheduled cooling time interval $[t_p^1, t_c^1]$.

However, the temperature deviation program 111 will proceed to step 204 if it determines in step 202 that the predicted total lethality $F^0$ over $[t_0, t_s]$ does not satisfy the target total lethality $F_{targtot}$. In this case, the program re-sets in step 204 the current simulation sampling time $t_s$ to the re-scheduled processing end time $t_p^1$ defined in step 195. The program 111 also re-sets in step 204 the lethality $F^1$ over $[t_0, t_s]$ to the predicted heating lethality $F^1$ over $[t_0, t_p^1]$ defined in step 195. And, the program re-sets in step 204 the product cold spot temperature $T_{CS}(t_s)^1$ to the product cold spot temperature $T_{CS}(t_p^1)^1$ defined step 195. Then, the steps 191 to 204 are repeated until the program re-defines the remaining processing portion of the re-scheduled remaining time-temperature profile $T_{sRT}(t)^1$ in step 196 and defines the cooling portion of the profile $T_{cRT}(t)^1$ in step 203.

3. Alternative Embodiments

As indicated earlier, the embodiment of controller 104 associated with FIGS. 6 to 12 and described in section 2 is only an exemplary embodiment. Alternative embodiments that utilize the principles and concepts developed in FIGS. 6 to 12 and section 2 do exist.

3.a. Scheduled Processing End Time $t_p^0$ Kept Constant

Figure 13:
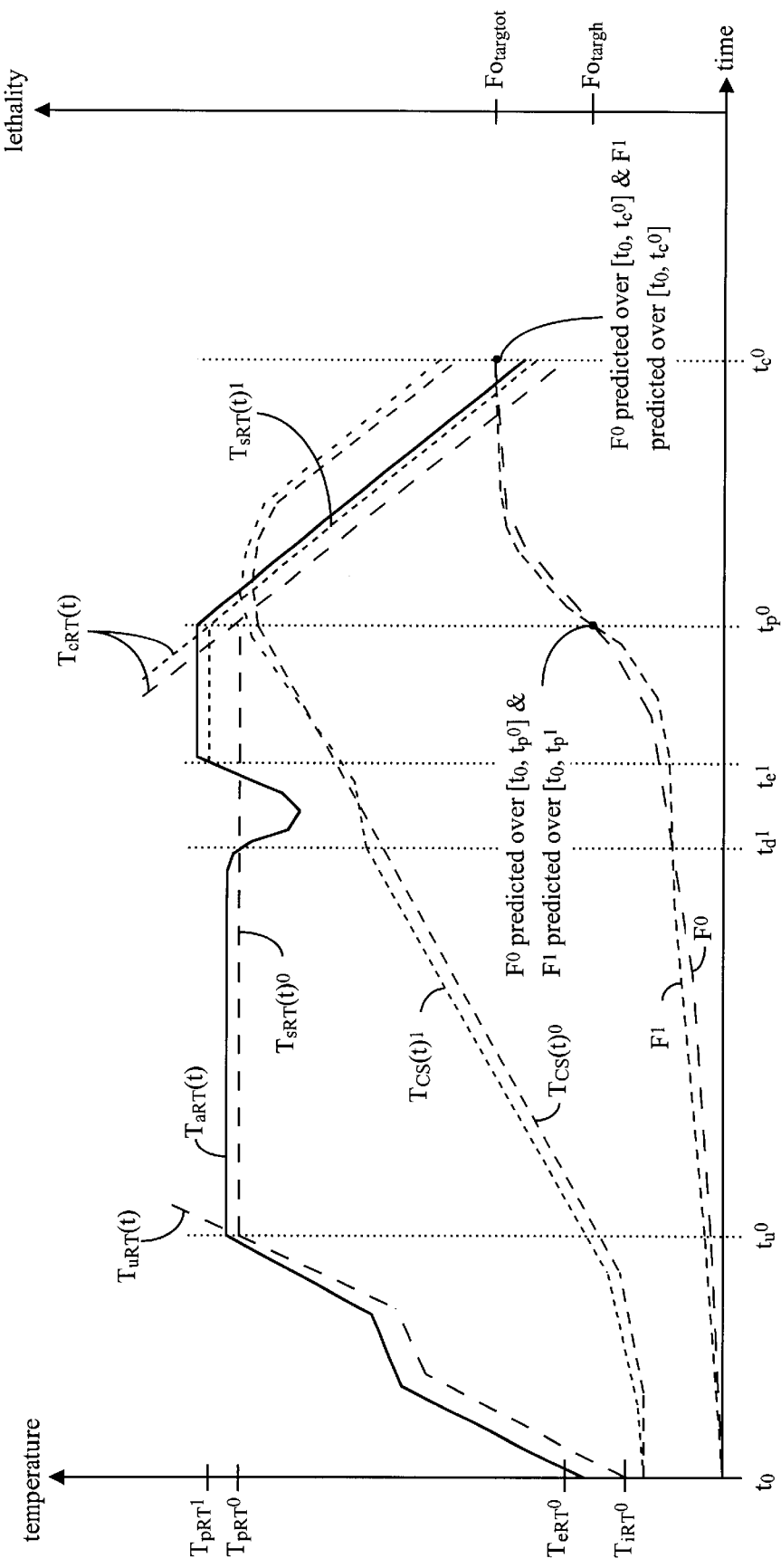
FIG. 13 is a timing diagram for another embodiment of the controller of FIG. 5.

For example, in one embodiment, the scheduled processing end time $t_p^0$ kept constant, as shown in FIG. 13. Thus, in this embodiment, the processing retort temperature $T_{pRT}^n$ scheduled in response to the nth temperature deviation will be re-scheduled whenever the (n+1)th temperature deviation occurs while the scheduled remaining processing time interval $[t_e^1, t_p^0]$ is kept the same.

More specifically, the remaining processing portion of the re-scheduled remaining time-temperature profile $T_{pRT}(t)^1$ will be defined as a constant re-scheduled remaining processing retort temperature $T_{pRT}^1$ over the time interval $[t_e^1, t_p^0]$ for the first temperature deviation. The process control program 109 detects the first temperature deviation when the actual retort temperature $T_{aRT}(t_d^1)$ at the deviation begin time $t_d^1$ is below the scheduled processing retort temperature $T_{pRT}^0$. Similar to step 138 of FIG. 6, the program 109 will cause the control circuitry 117 to administer a temperature deviation correction at each real sampling time $t_r$ during the deviation. However, in this case, the actual retort time-temperature profile $T_{aRT}(t_r)$ is brought up until the deviation is cleared between the profile $T_{aRT}(t_r)$ and the remaining processing portion of the profile $T_{pRT}(t)^1$. This occurs when the actual retort temperature $T_{aRT}(t_e)$ at the deviation end time $t_e^1$ is at least equal to the temperature $T_{pRT}^1$.

In order to define the re-scheduled remaining processing retort temperature $T_{pRT}^1$, the temperature deviation program 111 computes at each time $t_r$ during the temperature deviation the heating lethality $F^1$ predicted to be delivered over the scheduled heating time interval $[t_0, t_p^0]$. This is the sum of the heating lethality $F^1$ actually delivered over the expired real time interval $[t_0, t_r]$ and the heating lethality $F^1$ predicted to be delivered over the scheduled remaining processing time interval $[t_r, t_p^0]$. Moreover, this computation is made by simulating the processing phase over the time interval $[t_0, t_p^0]$ in a similar manner to that described earlier for the time interval $[t_0, t_p^1]$ in step 145 of FIG. 6. However, here, the lethality $F^1$ predicted over the time interval $[t_r, t_p^0]$ is computed based on the portion of the product cold spot time-temperature profile $T_{CS}(t)^1$ that is predicted over the time interval $[t_r, t_p^0]$. This simulation is performed by setting the temperature $T_{pRT}^1$ to the actual retort temperature $T_{aRT}(t_r)$ at the time $t_r$.

The computation just described is repeated at each real sampling time $t_r$ after the deviation begin time $t_d^1$ until the heating lethality $F^1$ predicted to be delivered over the time interval $[t_0, t_p^0]$ does satisfy the target heating lethality $F_{targh}$. When this finally occurs, the program 111 computes the total lethality $F^1$ predicted to be delivered over the re-scheduled total time interval $[t_0, t_c^1]$. Here, the lpredicted total ethality $F^1$ over $[t_0, t_c^1]$ will be the sum of the predicted heating lethality $F^1$ over $[t_0, t_p^0]$ and a cooling lethality $F^1$ predicted to be delivered over a re-scheduled cooling time interval $[t_p^0, t_c^1]$. This computation is made by simulating the cooling phase over the time interval $[t_p^0, t_c^1]$ in a similar manner to that described earlier for step 145 of FIG. 6. Here, however, the cooling time-temperature gradient $T_{cRT}(t)$ will be shifted to start at the re-scheduled remaining processing retort temperature $T_{pRT}^1$. As a result, the portion of the product cold spot time-temperature profile $T_{CS}(t)^1$ predicted to occur over the time interval $[t_p^0, t_c^1]$ will be based on the portion of the gradient $T_{cRT}(t)$ that is between the temperature $T_{pRT}^1$ and the ending retort temperature $T_{eRT}$ over the time interval $[t_p^0, t_c^1]$.

If the predicted total lethality $F^1$ over $[t_0, t_c^1]$ satisfies the target total lethality $F_{targtot}$, then the temperature deviation is cleared. But, if it does not, then the temperature deviation program 111 repeats the entire process just described for the next real sampling time $t_r+\Delta t_r$ until the target total lethality $F_{targtot}$ is finally satisfied and the deviation is cleared. When this occurs, the program defines the remaining processing portion of the re-scheduled remaining time-temperature profile $T_{sRT}(t)^1$ as the re-scheduled remaining processing retort temperature $T_{pRT}^1$ over the scheduled remaining processing time interval $[t_e^1, t_p^0]$. Similarly, the program defines the cooling portion of the re-scheduled remaining time-temperature profile $T_{sRT}(t)^1$ as the portion of the gradient $T_{cRT}(t)$ between the temperature $T_{pRT}^1$ and the scheduled ending retort temperature $T_{eRT}$ over the re-scheduled cooling time interval $[t_p^0, t_c^1]$.

Referring to FIG. 8, it is also possible in this embodiment that the processing phase will actually end at a current real sampling time $t_r$ while the temperature deviation is still occurring. In this case, the re-scheduled remaining time-temperature profile $T_{cRT}(t)^1$ is defined in the same manner as was described earlier for step 147 of FIG. 6.

The flow diagrams in FIGS. 6 and 9 to 12 and described in section 2 would of course have to be adjusted according to the foregoing discussion. However, the manner in which this is done will be obvious to those skilled in the art.

3.b. Re-Scheduled Remaining Processing Retort Temperature $T_{pRT}^1$ and End Time $t_p^1$ As a variation of the embodiment just described, the remaining processing portion of the re-scheduled remaining time-temperature profile $T_{pRT}(t)^1$ may comprise a re-scheduled remaining processing retort temperature $T_{pRT}^1$ over a re-scheduled remaining processing time interval $[t_e^1, t_p^1]$. This embodiment would therefore be a combination of the two previous embodiments described. In this way, both a re-scheduled processing end time $t_p^1$ and a re-scheduled remaining processing retort temperature $T_{pRT}^1$ may be defined when the first temperature deviation occurs. The same would be true for any subsequent deviations.

3.c. Handling Temperature Deviation in Come-Up Phase

It is possible that a temperature deviation will occur during the come-up phase between the actual retort time-temperature profile $T_{aRT}(t)$ and the come-up portion of the scheduled total time-temperature profile $T_{sRT}(t)^0$. There are numerous well known techniques for handling such a temperature deviation. However, as those skilled in the art will recognize, the technique disclosed herein for handling a temperature deviation during the processing phase may be used in another embodiment of the controller 104 for also handling a temperature deviation in the come-up phase.

3.d. Using Portion of Actual Retort Time-Temperature Profile $T_{aRT}(t)$

In step 139 of the embodiment described in section 2, the portion of the product cold spot time-temperature profile $T_{CS}(t)^1$ that actually occurs over the expired real time interval $[t_0, t_r]$ is based on the actual retort time-temperature profile $T_{aRT}(t)$ over this same time interval. However, a more conservative embodiment could be used. For example, the portion of the profile $T_{CS}(t)^1$ over the time interval $[t_0, t_d^1)$ may be based on the potion of the scheduled total time-temperature profile $T_{sRT}(t)$ over the scheduled time interval $[t_0, t_d^1)$ before the deviation began. Then, the portion of the profile $T_{CS}(t)^1$ over the time interval $[t_d^1, t_r]$ may be based on the portion of the profile $T_{aRT}(t)$ over this same time interval.

This means that the portion of the re-scheduled product cold spot time-temperature profile $T_{CS}(t)^1$ over the deviation time interval $[t_d^1, t_e^1)$ will be based on the portion of the profile $T_{aRT}(t)$ over the same time interval. The remaining portion of the profile $T_{CS}(t)^1$ over the re-scheduled remaining time interval $(t_e^1, t_c^1]$ will be simulated in the manner discussed earlier for step 145.

3.e. Without Heating Target Lethality $F_{targh}$

As mentioned earlier, the target heating lethality $F_{targh}$ may be an optional requirement in the batch sterilization system 100. Thus, in another embodiment, only the target total lethality $F_{targtot}$ would be used and the flow diagrams in FIGS. 6 and 9 to 12 would have to be adjusted accordingly.

3.f. Temperature Gradients in Processing and Remaining Processing Portions of Scheduled Total and Re-scheduled Remaining Time-Temperature Profiles $T_{sRT}(t)^0$ and $T_{sRT}(t)^1$ Finally, the scheduled total and re-scheduled remaining time-temperature profiles $T_{sRT}(t)^0$ and $T_{sRT}(t)^1$ were defined in steps 127 and 145 with scheduled and re-scheduled remaining processing retort temperatures $T_{pRT}(t)^0$ and $T_{pRT}(t)^1$ that are constant over the scheduled and re-scheduled remaining processing time intervals $[t_u^0, t_d^0]$ and $[t_e^1, t_d^1]$, respectively. However, as those skilled in the art will recognize, the profiles $T_{sRT}(t)^0$ and $T_{sRT}(t)^1$ may also be defined in such a way that they are not constant over the time intervals $[t_u^0, t_d^0]$ and $[t_e^1, t_d^1]$. In other words, the profiles $T_{sRT}(t)^1$ and $T_{sRT}(t)^1$ may be defined in such a way that their respective processing and remaining processing portions have temperature gradients over the time intervals $[t_u^0, t_d^0]$ and $[t_e^1, t_d^1]$ like their come-up and cooling portions.

4. Conclusion

Referring to FIGS. 7 and 13, it is important to note that the portion of the product cold spot time-temperature profile $T_{CS}(t)^1$ that actually occurs over the time interval $[t_0, t_e^1)$ is based on at least the portion of the actual retort time-temperature profile $T_{aRT}(t)$ that occurs over the deviation time interval $[t_d^1, t_e^1)$. This means that full credit is given to the heating lethality $F^1$ that is actually delivered over this time interval $[t_0, t_e^1)$ to the batch 101. As a result, the re-scheduled heating time interval $[t_0, t_p^1]$ will not be overly conservative and the food product in the batch will not be over processed.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A batch sterilization system comprising:
   a batch sterilizer which performs a batch sterilization process on a batch of containers containing a food product;
   a sensor which senses actual retort temperatures in the batch sterilizer during the batch sterilization process; and
   a controller which
      compile an actual retort time-temperature profile during the batch sterilization process from the actual retort temperatures sensed by the sensor;
      until a temperature deviation between the actual retort time-temperature profile and a scheduled time-temperature profile begins, controls the batch sterilizer so as to administer an initial portion of the batch sterilization process before the temperature deviation begins according to the scheduled time-temperature profile;
      in response to the temperature deviation, define a re-scheduled remaining time-temperature profile for a remaining portion of the batch sterilization process that begins when the temperature deviation clears by simulating the batch sterilization process based on at least the portion of the actual retort time-temperature profile compiled over a deviation time interval from when the temperature deviation begins to when the temperature deviation clear;
      during the temperature deviation, controls the batch sterilizer so as to administer corrections to clear the temperature deviation between the actual retort and re-scheduled remaining processing time-temperature profiles;
      when the temperature deviation has cleared, administers the remaining portion of the batch sterilization process according to the re-scheduled remaining time-temperature profile.

2. The batch sterilization system of claim 1 wherein the temperature deviation occurs during a processing phase of the batch sterilization process.

3. The batch sterilization system of claim 1 wherein the temperature deviation occurs during a come-up phase of the batch sterilization process.

4. The batch sterilization system of claim 1 wherein the batch of containers has a product cold spot and the batch sterilization system further comprises a controller which defines the re-scheduled remaining time-temperature profile by:

computing a total lethality predicted to be delivered to the product cold spot over the batch sterilization process that (a) is based on a product cold spot time-temperature profile, and (b) satisfies a target lethality to be delivered to the product cold spot;

simulating the product cold spot time-temperature profile based on at least the portion of the actual retort temperature profile over the deviation time interval and the re-scheduled remaining time-temperature profile.

5. The batch sterilization system of claim 4 wherein the controller is further configured to use a finite difference simulation model to simulate the product cold spot time-temperature profile.

6. The batch sterilization system of claim 4 wherein the total lethality is the sum of (a) a lethality actually delivered over an actual time interval from when the batch sterilization process begins to when the temperature deviation clear, and (b) a lethality predicted to be delivered over a remaining time interval from when the temperature deviation clears to when the batch sterilization process is predicted to end.

7. The batch sterilization system of claim 6 wherein the lethality actually delivered over the actual time interval is based on the portion of the product cold spot time-temperature profile over the actual time interval; and the portion of the product cold spot time-temperature profile over the actual time interval is based on the portion of the actual retort temperature profile over the deviation time interval and the portion of the scheduled time-temperature profile over a pre-deviation time interval from when the batch sterilization process begins and when the temperature deviation begins.

8. The batch sterilization system of claim 6 wherein the lethality actually delivered over the actual time interval is based on the portion of the product cold spot time-temperature profile over the actual time interval; and the portion of the product cold spot time-temperature profile over the actual time interval is based on the portion of the actual retort temperature profile over the actual time interval.

9. A method of administering and providing on-line correction of a batch sterilization process performed on a batch of containers, the method comprising the steps of:

compiling an actual retort time-temperature profile during the batch sterilization process from actual retort temperatures sensed during the batch sterilization process;

until a temperature deviation between the actual retort temperature profile and a scheduled time-temperature profile begins, administering an initial portion of the batch sterilization process before the temperature deviation begins according to the scheduled time-temperature profile;

in response to the temperature deviation, defining a re-scheduled remaining time-temperature profile for a remaining portion of the batch sterilization process that begins when the temperature deviation clears by simulating the batch sterilization process based on at least a portion of the actual retort time-temperature profile compiled over a deviation time interval from when the temperature deviation begins to when the temperature deviation clears;

during the temperature deviation, administering corrections to clear the temperature deviation between the actual retort and re-scheduled remaining time-temperature profiles;

when the temperature deviation clears, administering the remaining portion of the batch sterilization process according to the re-scheduled remaining time-temperature profile.

10. The method of claim 9 wherein the temperature deviation occurs during a processing phase of the batch sterilization process.

11. The method of claim 9 wherein the temperature deviation occurs during a come-up phase of the batch sterilization process.

12. The method of claim 9 wherein the batch of containers has a product cold spot and the step of defining the re-scheduled remaining time-temperature profile comprises the steps of:

computing a total lethality predicted to be delivered to the product cold spot over the batch sterilization process that (a) is based on a product cold spot time-temperature profile, and (b) satisfies a target lethality to be delivered to the product cold spot; and simulating the product cold spot time-temperature profile based on at least the portion of the actual retort temperature profile over the deviation time interval and the re-scheduled remaining time-temperature profile.

13. The method of claim 12 wherein a finite difference simulation model is used in the step of simulating the product cold spot time-temperature profile.

14. The method of claim 12 wherein the total lethality is the sum of (a) a lethality actually delivered over an actual time interval from when the batch sterilization process begins to when the temperature deviation clears, and (b) a lethality predicted to be delivered over a remaining time interval from when the temperature deviation clears to when the batch sterilization process is predicted to end.

15. The method of claim 14 wherein:

the lethality actually delivered over the actual time interval is based on the portion of the product cold spot time-temperature profile over the actual time interval; and the portion of the product cold spot time-temperature profile over the actual time interval is based on the portion of the actual retort temperature profile over the deviation time interval and the portion of the schedule time-temperature profile over a pre-deviation time interval from when the batch sterilization process begins and when the temperature deviation begins.

16. The method of claim 14 wherein:

the lethality actually delivered over the actual time interval is based on the portion of the product cold spot time-temperature profile over the actual time interval; and the portion of the product cold spot time-temperature profile over the actual time interval is based on the portion of the actual retort temperature profile over the actual time interval.

* * * * *